United States Patent
Calabrese Barton et al.

(10) Patent No.: US 9,379,388 B2
(45) Date of Patent: Jun. 28, 2016

(54) CATALYST FOR OXYGEN REDUCTION REACTION IN FUEL CELLS

(71) Applicant: Board of Trustees of Michigan State University, East Lansing, MI (US)

(72) Inventors: Scott A. Calabrese Barton, East Lansing, MI (US); Kothandaraman Ramanujam, Chennai (IN); Vijayadurga Nallathambi, East Lansing, MI (US)

(73) Assignee: Board of Trustees of Michigan State University, East Lansing, MI (US)

(*) Notice: Subject to any disclaimer, the term of this patent is extended or adjusted under 35 U.S.C. 154(b) by 597 days.

(21) Appl. No.: 13/815,102

(22) Filed: Jan. 30, 2013

(65) Prior Publication Data

US 2013/0280419 A1 Oct. 24, 2013

Related U.S. Application Data

(63) Continuation of application No. 13/068,651, filed on May 17, 2011, now abandoned, which is a continuation-in-part of application No. 12/583,532, filed on Aug. 21, 2009, now abandoned.

(60) Provisional application No. 61/090,780, filed on Aug. 21, 2008.

(51) Int. Cl.
*H01M 4/00* (2006.01)
*H01M 4/86* (2006.01)
(Continued)

(52) U.S. Cl.
CPC ............ *H01M 4/8652* (2013.01); *H01M 4/881* (2013.01); *H01M 4/8807* (2013.01);
(Continued)

(58) Field of Classification Search
CPC ........................................................ H01M 4/00
USPC .................................................. 502/101, 167
See application file for complete search history.

(56) References Cited

U.S. PATENT DOCUMENTS 3,369,938 A 2/1968 Kroeger et al.
5,240,893 A * 8/1993 Witherspoon ................ 502/101
(Continued)

FOREIGN PATENT DOCUMENTS

WO WO 2007/086954 8/2007
WO WO 2007/124200 11/2007
WO WO 2007/140051 12/2007

OTHER PUBLICATIONS

Atanasoski et al., 3M Company Fuel Cell Components Program, Novel Approach to Non-Precious Metal Catalysts, Final Report, Nov. 19, 2007, 307 pages, http://www.osti.gov/bridge/purl.cover.jsp-?purl=/919780-9eoMDC/.
(Continued)

*Primary Examiner* — Patricia L Hailey
(74) *Attorney, Agent, or Firm* — Harness, Dickey & Pierce, P.L.C.

(57) ABSTRACT

A method for making a carbon-metal-nitrogen oxygen reducing cathode catalyst, the method comprising mixing a carbon source with a transition metal precursor to form a metal precursor loaded carbon substrate; adding a nitrogen precursor compound to the metal precursor loaded carbon substrate to form a carbon-metal-nitrogen precursor; and pyrolyzing the carbon-metal-nitrogen precursor in a closed vessel, thereby forming an oxygen reducing cathode catalyst. The carbon-metal-nitrogen catalyst requires no precious metal such as Pt, and also provides benefits such as controlled deposition of catalytically active nitrogenous compounds that can increase the catalytic activity of the catalyst when compared to gaseous deposition of nitrogen to the surface of the carbon support.

21 Claims, 10 Drawing Sheets

(51) Int. Cl.
- H01M 4/88 (2006.01)
- H01M 4/90 (2006.01)
- H01M 4/92 (2006.01)
- H01M 4/96 (2006.01)
- H01M 8/10 (2016.01)

(52) U.S. Cl.
CPC .............. *H01M4/8825* (2013.01); *H01M 4/90* (2013.01); *H01M 4/92* (2013.01); *H01M 4/96* (2013.01); *H01M 8/1004* (2013.01); *H01M 2008/1095* (2013.01); *Y02E 60/521* (2013.01); *Y02P 70/56* (2015.11)

(56) References Cited

U.S. PATENT DOCUMENTS

| | | | |
|---|---|---|---|
| 5,432,140 | A | 7/1995 | Sumpter et al. |
| 6,291,090 | B1 | 9/2001 | Kuznetsov et al. |
| 6,558,441 | B1 | 5/2003 | Sato |
| 7,629,285 | B2 * | 12/2009 | Popov et al. ............... 502/180 |
| 2003/0220498 | A1 | 11/2003 | Furstner et al. |
| 2004/0236157 | A1 * | 11/2004 | Heilgendorff et al. ........ 568/881 |
| 2005/0101481 | A1 | 5/2005 | Ruth et al. |
| 2007/0082253 | A1 | 4/2007 | Zelenay et al. |
| 2007/0082804 | A1 | 4/2007 | Zelenay et al. |
| 2007/0248752 | A1 | 10/2007 | Obrien et al. |
| 2007/0248875 | A1 | 10/2007 | O'Brien et al. |
| 2007/0281852 | A1 | 12/2007 | Choi et al. |
| 2008/0113859 | A1 | 5/2008 | Popov et al. |
| 2008/0161183 | A1 | 7/2008 | Popov et al. |
| 2008/0166599 | A1 | 7/2008 | Swathirajan et al. |
| 2009/0126604 | A1 | 5/2009 | Akhtar et al. |
| 2009/0130502 | A1 | 5/2009 | Liu et al. |
| 2011/0319257 | A1 | 12/2011 | Wood et al. |
| 2012/0077667 | A1 * | 3/2012 | Liu et al. ...................... 502/101 |

OTHER PUBLICATIONS

Bashyam et al., A Class of Non-Precious Metal Composite Catalysts for Fuel Cells, Nature 443(7):63-66 (2006).

Bezerra et al., A Review of Fe—N/C and Co—N/C Catalysts for the Oxygen Reduction Reaction, Electrochimica Acta 53:4937-4951 (2008). doi:10.1016/j.electacta.2008.02.012.

Bron et al., EXAFS, XPS and Electrochemical Studies on Oxygen Reduction Catalysts Obtained by Heat Treatment of Iron Phenanthroline Complexes Supported on High Surface Area Carbon Black, Journal of Electroanalytical Chemistry 535:113-119 (2002).

Deng et al., Sputtered Cobalt—Carbon—Nitrogen Thin Films as Oxygen Reduction Electrocatalysts, Journal of the Electrochemical Society 145(10):3507-3512 (1998).

Gojkovic et al., Heat-Treated Iron(III) Tetramethoxyphenyl Porphyrin Supported on High-Area Carbon as an Electrocatalyst for Oxygen Reduction, Journal of the Electrochemical Society 145(10):3493-3499 (1998).

Gouerec et al., Oxygen Reduction in Acid Media Catalysed by Heat Treated Cobalt Tetraazaannulene Supported on an Active Charcoal: Correlations Between the Performances After Longevity Tests and the Active Site Configuration as Seen by XPS and ToF-SIMS, Journal of Electroanalytical Chemistry 422:61-75 (1997).

Gupta et al., Heat-treated Polyacrylonitrile-based Catalysts for Oxygen Electroreduction, Journal of Applied Electrochemistry 19:19-27 (1989).

Gupta et al., Methanol-tolerant Electrocatalysts for Oxygen Reduction in a Polymer Electrolyte Membrane Fuel Cell, J. Appl. Elecrochem. 28:673-682 (1998).

Jaouen et al., Oxygen Reduction Catalysts for Polymer Electrolyte Fuel Cells from the Pyrolysis of Iron Acetate Adsorbed on Various Carbon Supports, Journal of Physical Chemistry B 107:1376-1386 (2003).

Jasinski, A New Fuel Cell Cathode Catalyst, Nature 201:1212-1213 (1964).

Kothandaraman et al., Non-precious oxygen reduction catalysts prepared by high-pressure pyrolysis for low-temperature fuel cells, Applied Catalysis B: Environmental, 92:209-216 (2009). doi:10.1016/j.apcatb.2009.07.005.

Lefevre et al., Molecular Oxygen Reduction in PEM Fuel Cell Conditions: ToF-SIMS Analysis of Co-Based Electrocatalysts, Journal of Physical Chemistry B 109:16718-16724 (2005).

Lefevre et al., Molecular Oxygen Reduction in PEM Fuel Cells: Evidence for the Simultaneous Presence of Two Active Sites in Fe-Based Catalysts, Journal of Physical Chemistry B 106:8705-8713 (2002).

Maldonado et al., Influence of Nitrogen Doping an Oxygen Reduction Electrocatalysis at Carbon Nanofiber Electrodes, Journal of Physical Chemistry B 109:4707 (2005).

Matter et al., Preparation of Nanostructured Nitrogen-Containing Carbon Catalysts for the Oxygen Reduction Reaction from $SiO_2$- and MgO-Supported Metal Particles, Journal of Catalysis 243:395-403 (2006).

Matter et al., The Role of Nanostructure in Nitrogen-Containing Carbon Catalysts for the Oxygen Reduction Reaction, Journal of Catalysis 239:83-96 (2006).

Nallathambi et al., Development of High Performance Carbon Composite Catalyst for Oxygen Reduction Reaction in PEM Proton Exchange Membrane Fuel Cells, Journal of Power Sources 183:34-42 (2008). doi:10.1016/j.jpowsour.2008.05.020.

Nallathambi et al., Metal Nitrogen Carbon (MNC) Catalysts by high-pressure pyrolsis using ammonia-generating precursors, 241st ACS National Meeting, Anaheim, CA, Mar. 2011, pp. 1-21.

Nallathambi et al., Nitrogen Precursor Effects in Iron—Nitrogen—Carbon Oxygen Reduction Catalysts, Electrochemical and Solid-State Letters, 14(6), B55-B58 (2011). doi:10.1149/1.3566065.

Proietti et al., Fe-Based Electrocatalysts for Oxygen Reduction in PEMFCs Using Ballmilled Graphite Powder as a Carbon Support, Journal of the Electrochemical Society 155(4):B340-B348 (2008).

Sawai et al., Heat-Treated Transition Metal Hexacyanometallates as Electrocatalysts for Oxygen Reduction Insnsitive to Methanol, Journal of the Electrochemical Society 151(5):A682-A688 (2004).

Shukla et al., Methanol-Resistant Oxygen-Reduction Catalysts for Direct Methanol Fuel Cells, Annual Review of Materials Research 33:155-68 (2003).

Wiesener et al., N4 Macrocycles as Electrocatalysts for the Cathodic Reduction of Oxygen, Materials Chemistry and Physics 22:457-475 (1989).

Zhang et al., Progress in Preparation of Non-Noble Electrocatalysts for PEM Fuel Cell Reactions, Journal of Power Sources 156:171-182 (2006). doi:10.1016/j.jpowsour.2005.05.069.

* cited by examiner

US 9,379,388 B2

CATALYST FOR OXYGEN REDUCTION REACTION IN FUEL CELLS

CROSS-REFERENCE TO RELATED APPLICATIONS

This application is a continuation of U.S. patent application Ser. No. 13/068,651, filed on May 17, 2011, which is a continuation-in-part of U.S. patent application Ser. No. 12/583,532, filed on Aug. 21, 2009, which claims the benefit of U.S. Provisional Patent Application No. 61/090,780, filed Aug. 21, 2008. The entire disclosures of each of the above applications are incorporated herein by reference.

INTRODUCTION

The present technology relates to methods for producing improved metal, nitrogen, and carbon containing catalysts effective for the reduction of oxygen in low temperature fuel cells and other electrochemical reactions and cathode catalysts produced by these methods.

There is an increasing interest to replace platinum (Pt) based electro-catalysts with cost-effective non-noble catalysts for the oxygen reduction reaction ("ORR") in low-temperature fuel cells, such as Polymer Electrolyte Fuel Cells (PEFCs) and Direct Methanol Fuel Cells ("DMFCs") etc. Non-noble metal catalysts based on iron (Fe) and cobalt (Co) ions are among the possible candidates for replacement of Pt based catalyst metals for ORR. These catalysts are active towards ORR and exhibit selectivity towards ORR in the presence of a fuel, thereby increasing the volumetric energy density of a DMFC.

Others in the field have discovered the catalytic nature of nitrogen-doped carbon materials, and subsequently various non-precious metal catalysts were produced by pyrolyzing materials such as metal-$N_4$ macrocyles adsorbed on carbon black in an inert atmosphere. Others have demonstrated an active catalyst for ORR by pyrolyzing a metal precursor (cobalt acetate), carbon black and a nitrogen precursor such as polyacrylonitrile in inert atmosphere. Following this approach, many methods have been developed to prepare non-noble metal catalysts, including these steps: (a) heat-treating carbon-supported organometallic complexes by pyrolyzing a metal source with carbon source in ammonia or acetonitrile atmosphere, (b) cosputtering cobalt or iron and carbon in a nitrogen atmosphere with or without subsequent heat-treatment, and (c) mixing nitrogen-containing ligands with cobalt oxide solution which are subsequently entrapped in polypyrrole matrix supported on carbon.

Recently, investigators have ball-milled highly-ordered synthetic graphite for use as a carbon support as it contains low levels of iron as impurities and low surface area (3.5 $m^2/g$), Pyrolysis of the milled material with an iron source in ammonia environment produced catalysts with nitrogen content as high as 4 atom %. These nitrogen containing catalysts demonstrate that the catalytic activity increases as a result of decreasing metal crystallite size, increasing degree of disorder, nitrogen content, and microporous (<22 Å) specific surface area. Others in the field have also suggested that active sites containing pyridinic nitrogen can be responsible for the catalytic activity for ORR and reported low levels of $H_2O_2$ production while reducing oxygen in an acidic medium.

U.S. Patent Application Publication No. 2007/0248752, O'Brien et al., published Oct. 25, 2007, discloses making an oxygen-reducing catalyst layer. The catalyst layer is prepared by physical vapor depositing (PVD) a transition metal onto a carbon support under a reduced pressure (e.g. about $1 \times 10^{-5}$ Torr or less). After a film of catalyst metal has been applied to a substrate, the resulting coated substrate is thermally treated either separately or as part of the PVD step. The thermal treatment and/or PVD treatment can be performed under a nitrogen gas environment to provide a source of nitrogen to the catalyst. The thermal treatment can comprise heating the coated substrate for 15 minutes or so at temperatures of at least 600-900° C. However, the deposition of the nitrogen source is not readily controllable. Moreover, it is believed that a greater amount of nitrogen can be incorporated into a high-surface area support by introducing nitrogen at higher activity (for example, higher partial pressure) in the presence of the carbon support in contrast to the use of gaseous nitrogen at reduced pressure.

As such there is a need for alternative methods for producing alternative catalyst materials having improved catalytic activity. There is also a need for methods to increase the availability of nitrogen target sites on catalytic supports for oxygen reduction reactions and provide enhanced stability of these alternative catalysts when used in acidic fuel cell environments.

SUMMARY

The present technology provides methods for making non-precious metal electrochemical cathode catalysts for the reduction of molecular oxygen, for example, in a fuel cell. In addition, the present technology provides for a method to control the anchoring of a nitrogen containing compound on a high surface area carbon surface, which actively contributes to the catalytic activity of the cathode catalyst over preexisting methods of depositing nitrogen, thereby effectively increasing the catalytic activity per unit mass of catalytic material on a substrate. The cathode catalyst material produced in accordance with the present technology lowers the cost for producing the catalyst material and follows a simple synthesis method compared to platinum/carbon catalysts and other non-precious metal catalysts conventionally used in fuel cell designs.

In one aspect, the present technology provides a method for making a carbon-metal-nitrogen oxygen reducing cathode catalyst, the method comprising:
  (a) mixing a carbon source with a transition metal precursor to form a metal precursor loaded carbon substrate, preferably wherein the substrate is substantially free of precious metals;
  (b) adding a nitrogen precursor compound to the metal precursor loaded carbon substrate to form a carbon supported metal-nitrogen complex precursor; and
  (c) pyrolyzing the carbon-metal-nitrogen precursor at an elevated pressure to form an oxygen reducing cathode catalyst.

In another aspect, the present technology provides for a method for making a membrane electrode assembly for a fuel cell, the membrane electrode assembly comprising:
  (a) an ionomeric membrane;
  (b) an anode catalyst disposed on a first surface of the ionomeric membrane; and
  (c) a cathode catalyst disposed on a second surface of the ionomeric membrane wherein the cathode catalyst is synthesized by:
    (i) mixing a carbon source with a transition metal precursor to form a metal precursor loaded carbon substrate, preferably wherein the substrate is free of precious metals;

(ii) adding a nitrogen precursor compound to the metal precursor loaded carbon substrate to form a carbon supported metal-nitrogen complex precursor; and (iii) pyrolyzing the carbon supported metal-nitrogen complex precursor at an elevated pressure to form an oxygen reducing cathode catalyst.

Still further, the present technology provides a method for making a cathode catalyst coated diffusion layer for a fuel cell, the method comprising:

(a) providing a gas diffusion layer; and (b) applying a cathode catalyst on at least a portion of the gas diffusion layer, wherein the cathode catalyst is synthesized by:

(i) mixing a carbon source with a transition metal precursor to form a metal precursor loaded carbon substrate, preferably wherein the substrate is free of precious metals;

(ii) adding a nitrogen precursor compound to the metal precursor loaded carbon substrate to form a carbon-metal-nitrogen precursor; and (iii) pyrolyzing the carbon-metal-nitrogen precursor at a pressure ranging from about 2 bar to about 100 bar, thereby forming an oxygen reducing cathode catalyst.

In yet another aspect, the present technology provides method for making an oxygen reducing cathode catalyst, the method comprising:

(a) mixing a carbon source with a transition metal precursor to form a metal precursor loaded carbon substrate substantially free of precious metals;

(b) adding a nitrogen precursor compound having a N:C ratio of at least about 1:1 to the metal precursor loaded carbon substrate to form a carbon-metal-nitrogen precursor; and (c) pyrolyzing the carbon-metal-nitrogen precursor at an elevated pressure ranging from about 2 bar to about 100 bar, thereby forming the oxygen reducing cathode catalyst.

DRAWINGS

The patent or application file contains at least one drawing executed in color. Copies of this patent or patent application publication with color drawings will be provided by the U.S. Patent and Trademark Office upon request and payment of the necessary fee.

Figure 7A:
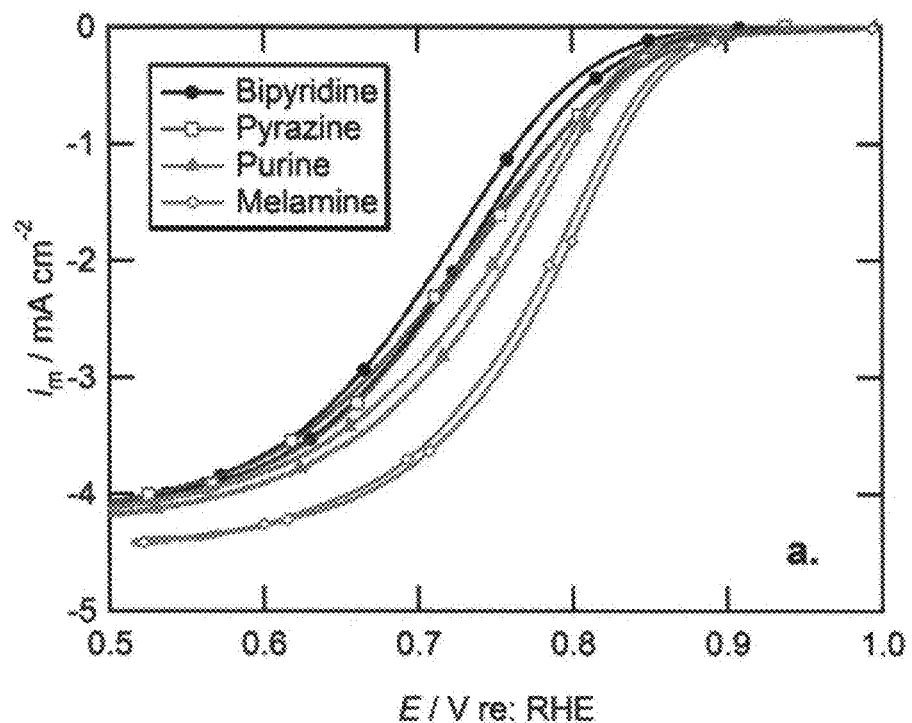
Figure 7B:
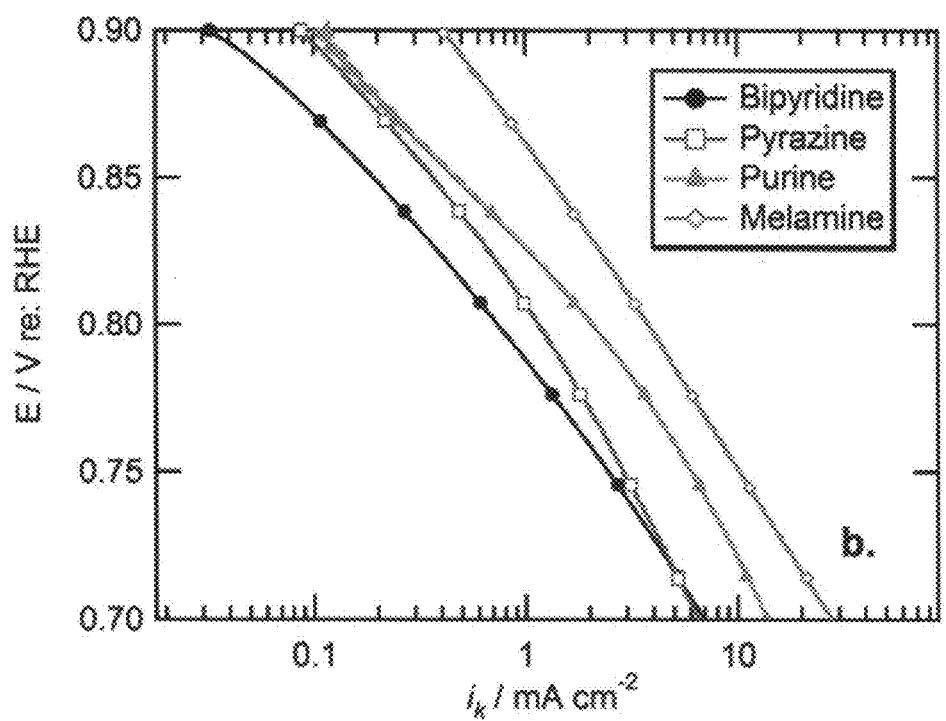
Figure 7C:
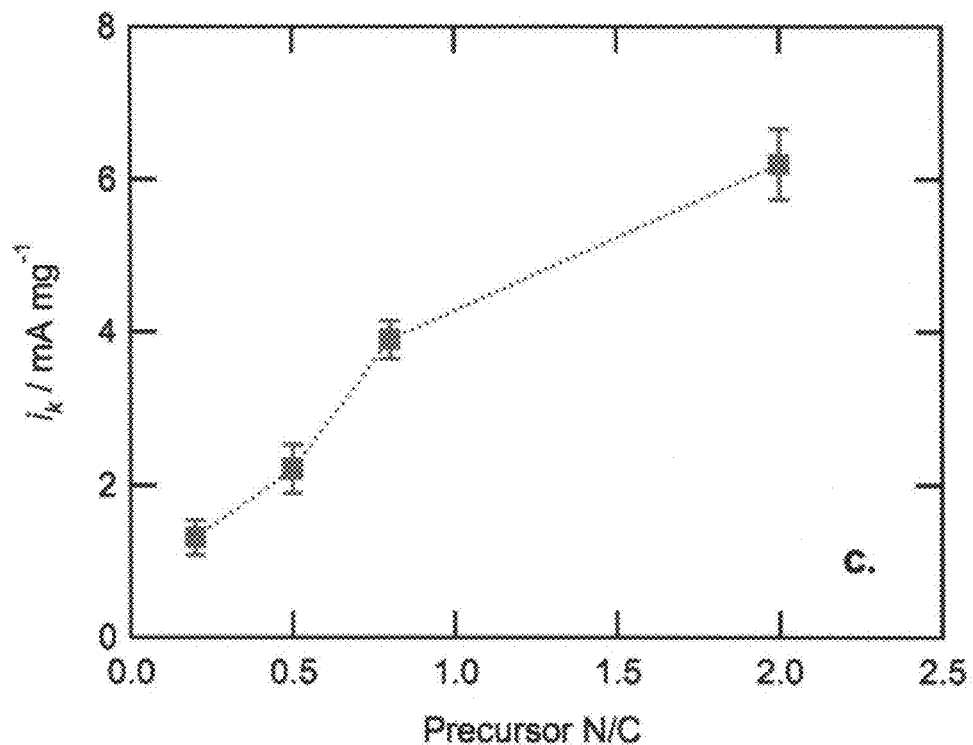
Figure 7D:
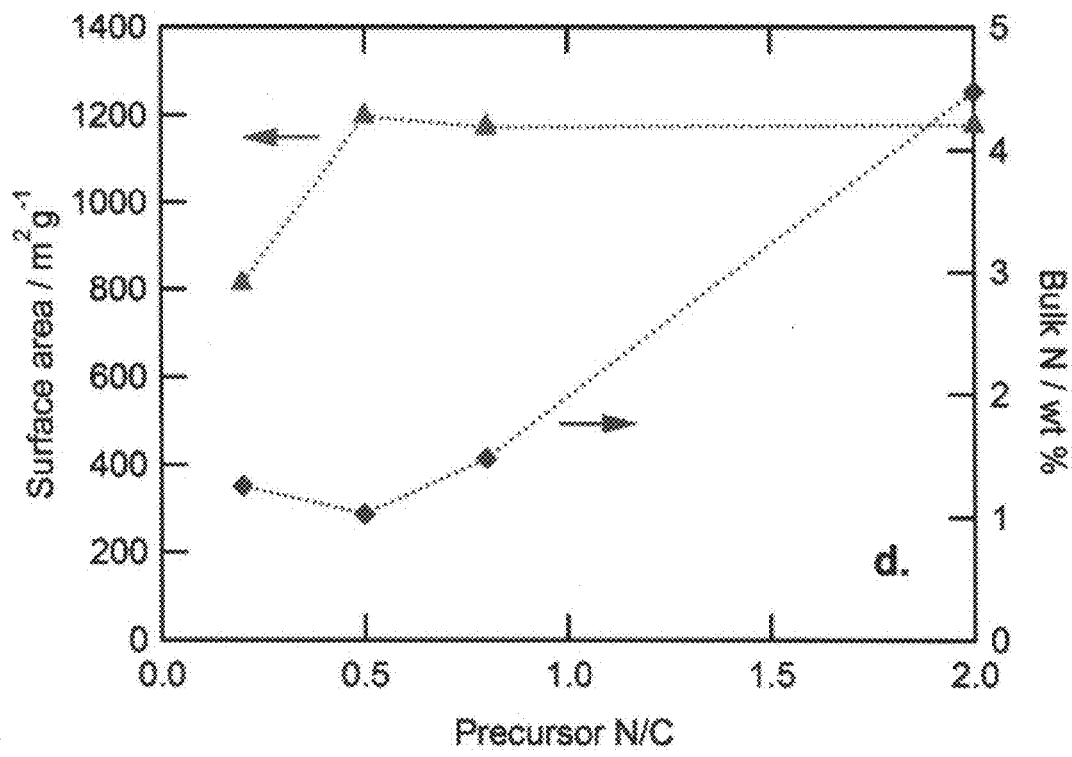

FIGS. 7A-7D relate to oxygen reduction current density at thin-film rotating disk electrodes with MNC catalysts of varying precursor N:C ratios. FIG. 7A depicts pseudo-steady state polarization; FIG. 7B depicts iR- and mass transfer corrected Tafel curves; FIG. 7C depicts kinetic current density at 0.8 V/RHE as a function of precursor N:C with the conditions: O2-saturated, 1N aqueous sulfuric acid, 40° C. Scan rate 0.5 mV s$^{-1}$, 1200 rpm, nominal 6.3 wt % nitrogen loading; FIG. 7D depicts observed BET surface area and bulk nitrogen obtained through CHN analysis.

Figure 8A:
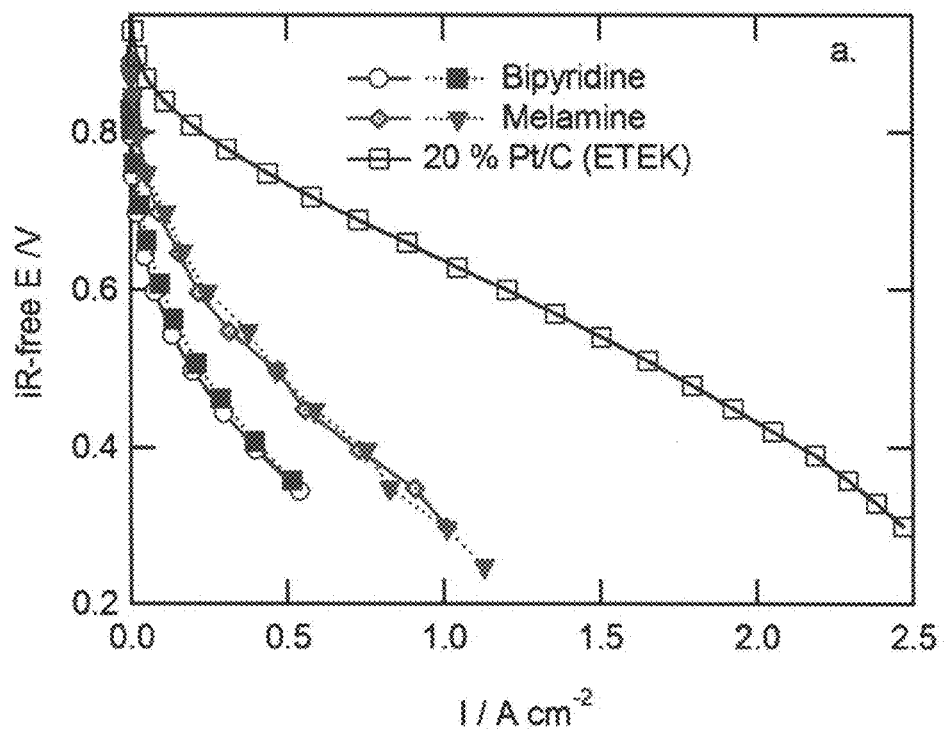
Figure 8B:
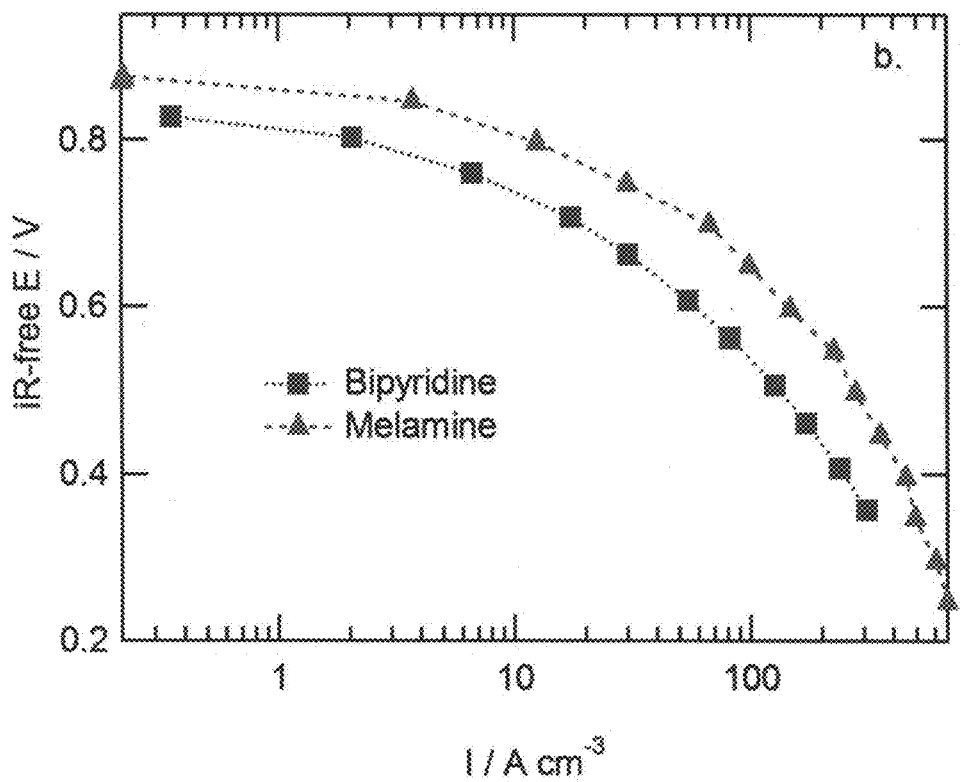
Figure 8C:
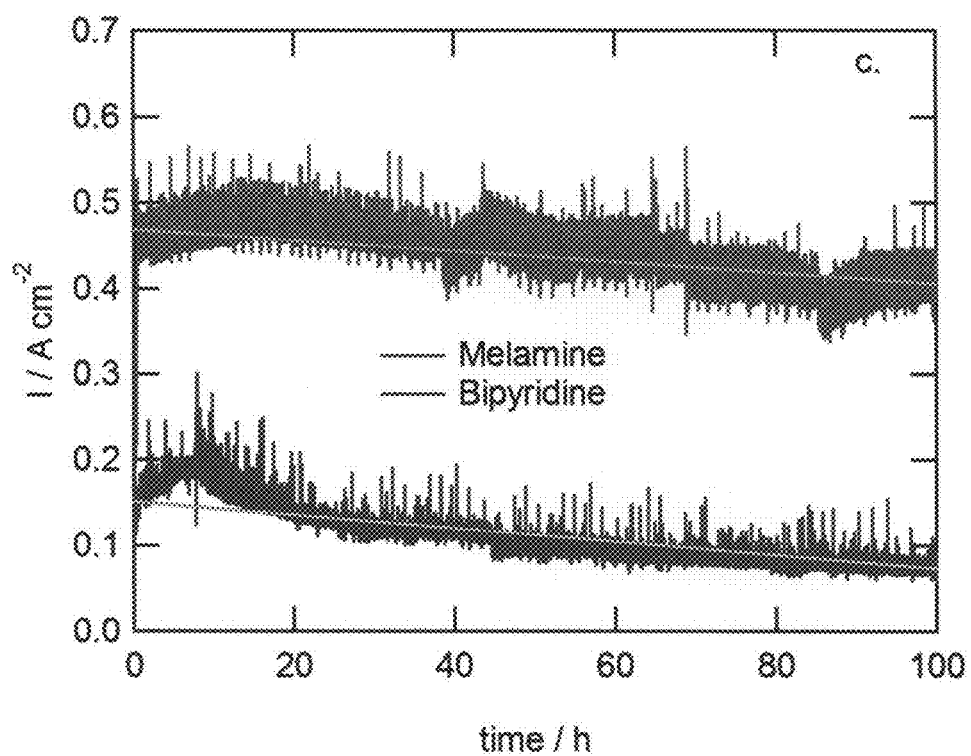
Figure 8D:
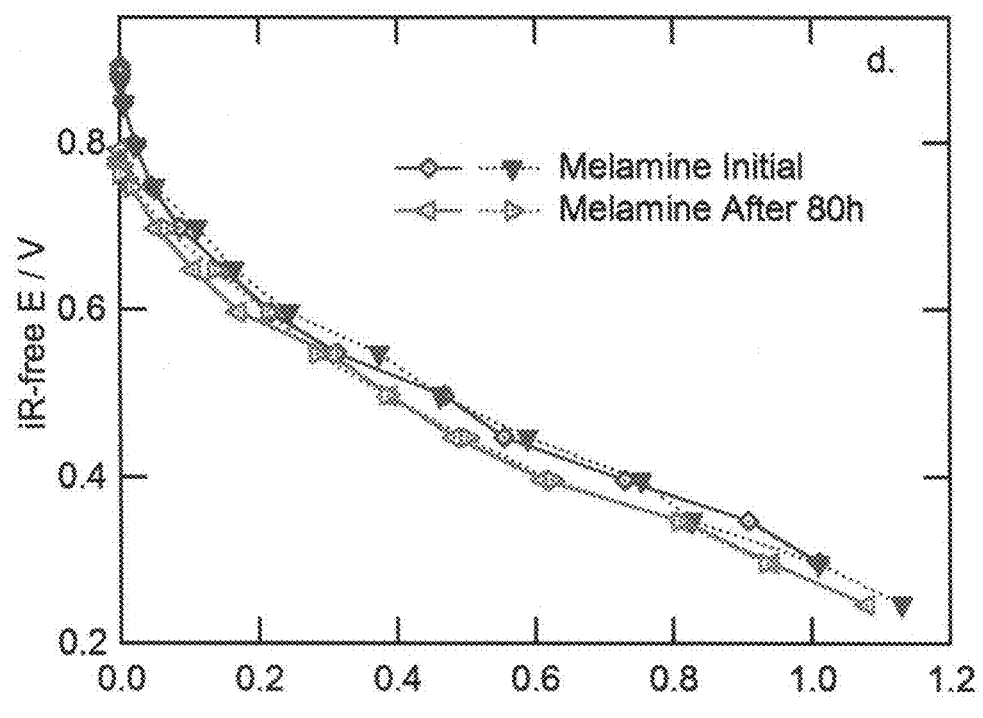

FIGS. 8A-8D relate to performance of fuel cell membrane-electrode assemblies employing Fe—NC oxygen reduction catalysts. FIGS. 8A and 8B depict polarization curves for Fe-bipyridine and Fe-melamine based catalysts, in comparison to a commercial Pt-catalyzed MEA (solid and dotted lines indicate forward and reverse scans respectively); FIGS. 8C and 8D depict durability of Fe-melamine and Fe-bipyridine based MEA fuel cells at 0.5 V/RHE; Conditions: $H_2$—$O_2$ feeds ($p_{O2}=p_{H2}$=1.5 bar, 80° C., 100% RH), MNC catalyst loading 1.3 mg cm$^{-2}$.

It should be noted that the figures set forth herein are intended to exemplify the general characteristics of an apparatus, materials and methods among those of the present technology, for the purpose of the description of such embodiments herein. These figures may not precisely reflect the characteristics of any given embodiment, and are not necessarily intended to define or limit specific embodiments within the scope of this technology.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. A non-limiting discussion of terms and phrases intended to aid understanding of the present technology is provided at the end of this Detailed Description.

In accordance with the various embodiments of the present technology, it has been discovered that an effective way of preparing a cathode-catalyst which, is used in low temperature fuel cells and other electrochemical cell applications can be achieved by pyrolyzing the catalyst components under high temperature in a closed vessel. The vessel can be pressurized due to the catalyst-components (autogenic pressure) to deliver a finite and specific amount of nitrogen content to the catalyst and more particularly, to control the ratio of nitrogen to carbon. In various embodiments, methods produce cathode catalysts with higher yields without gasifying carbon precursor. Having processes capable of producing a more efficient and non-gasified catalysts directly translates to a higher catalytic activity per unit of mass, volume and a lower cost per unit catalytic activity.

Although the present technology is not limited to or dependent on a particular theory, it is believed that the transition metal/nitrogen component on the carbon support promotes the reduction of molecular oxygen to water.

Figure 1:
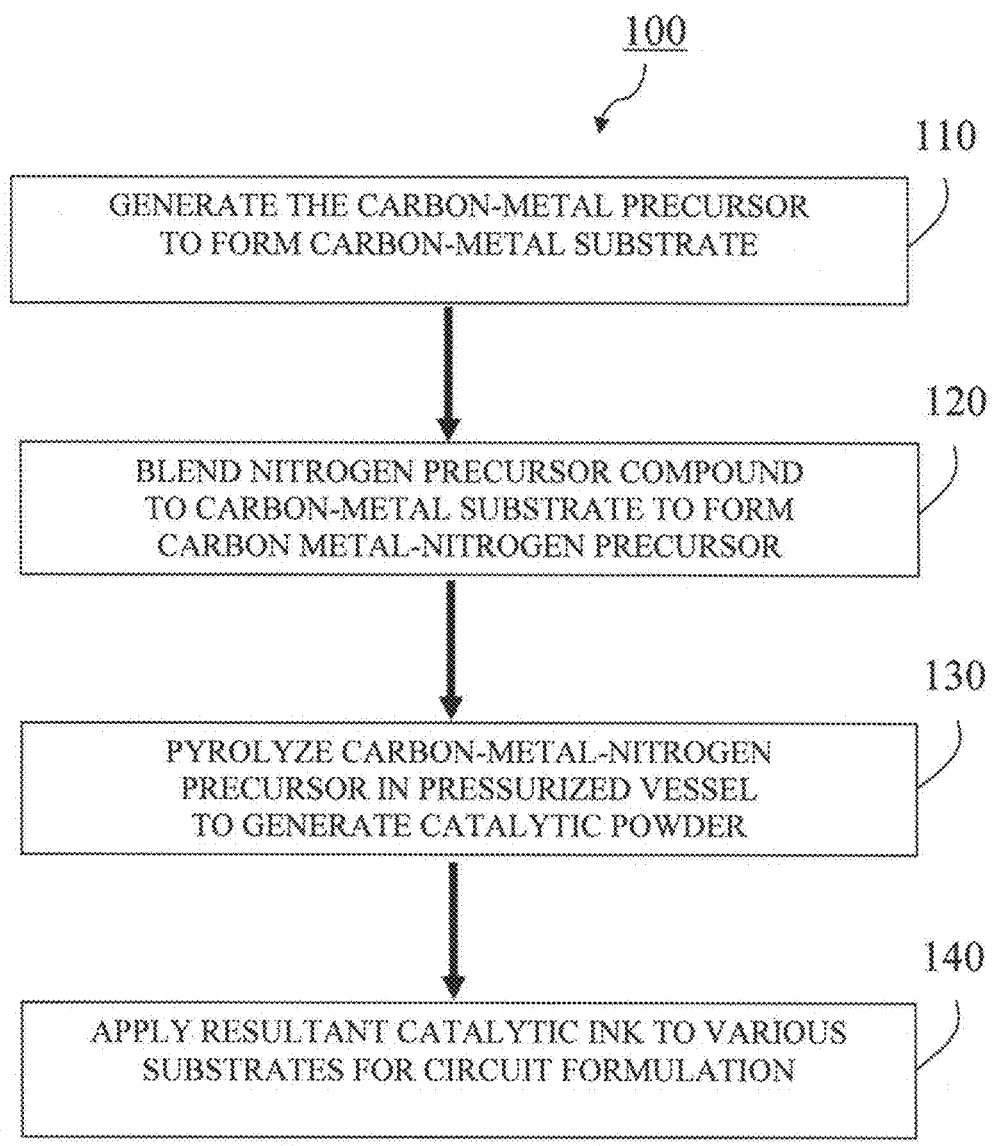
FIG. 1 is a flow diagram of a method for making an oxygen reduction cathode catalyst in accordance with the methods of the present technology.

FIG. 1 represents a flow diagram of method 100 for making a cathode catalyst for the reduction of oxygen typically found in a fuel cell and includes steps 110-140. Method 100 initially involves generating a carbon-metal substrate (step 110). Step 110 generally involves mixing a carbon support and a transition metal precursor. In some embodiments, the carbon support and transition metal precursor are mixed in the presence of a chemically compatible solvent, for example, a small chain alcohol and water. The alcohol can be any $C_1$-$C_6$ alcohol, for example, ethanol, isopropyl alcohol, n-propyl alcohol and butanol which are readily or moderately miscible with water, the carbon support and the transition metal. The dispersion can be stirred for one to six hours to have the transition metal precursor deposited to the carbon support.

In some embodiments, the amount of transition metal added to the carbon support (as a percentage of dry weight of the two components) can range from about 0.01% to about 30% by weight. In various aspects, the amount of metal ranges from about 0.1% by weight to about 10% by weight, or from about 0.5% to about 10% by weight, or from about 0.75% to about 10% by weight, or from about 1% to about 10% by weight, or from about 2% to about 10% by weight, or from about 5% to about 10% by weight, or from about 0.1% to about 8% by weight, or from about 0.1% to about 6% by weight, or from about 0.1% to about 5% by weight, or from about 0.1% to about 3% by weight, or from about 0.1% to about 2% by weight.

Carbon Support

The carbon support can include any activated or non-activated carbon material, generally having a high surface area. In some embodiments, the carbon support can include one or more of the following illustrative examples of carbon supports including: carbon powder, carbon black, acetylene black, activated carbon, carbon fiber, fullerene, nano-carbon or combinations thereof. Specific examples of carbon supports among those useful in the present technology include Norit® SX Ultra (Marshall, Tex., USA), Ketjenblack® (600J and 300J, Akzo-Nobel Polymer Chemicals, Chicago, Ill., USA), $C_{5-5}$ carbon particles (Chevron Phillips Chemical Company, TX), Black Pearls® (Cabot Corporation, Boston, Mass., USA), Printex® XE (Degussa Engineered Carbons, Parsipanny, N.J., USA), pyrrole black, activated charcoal, graphitic powder, Vulcan® XC72 (Cabot Corporation, Boston, Mass., USA) and pyrolyzed form of perylene tetracarboxylic anhydride (PTCDA), polyacrylonitrile (PAN), and combinations thereof.

Ketjenblack® is an electroconductive carbon black, in pellet form, having a pore volume of from about 300 ml/100 g to 520 ml/100 g (e.g., 310-345 ml/100 g, and 480-510 ml/100 g) with fines (<125 micron) of less than about 7%, a pH of 8-10, and an apparent bulk density of from about 100 to about 150 kg/m$^3$ (e.g., 125-145 kg/m$^3$, and 100-120 kg/m$^3$). Black Pearls® engineered pigment black has an OAN of 65 cc/100 g, a 325 mesh residue of less than 200 ppm, and a density of 430 kg/m$^3$. $C_{5-5}$ carbon black consists of acetylene black carbon particles, 99.99% purity, having a surface area of 82 m$^2$/g, and is commercially available under the trade designation "Shawinigan Black, Grade C55." Norit® SX Ultra is an acid washed, steam activated carbon having a surface area (BET), of about 1200 m$^2$/g, an apparent density, tamped, of 0.32 g/mL, a particle size distribution of d10 of 5 μm, d50 of 25 μm, d90 of 100 μm, and a pH of about 7. Printex® carbon black has a CTAB surface area of 600 m$^2$/g, an OAN of 380 ml/100 g, a COAN of 370 ml/100 g, a sieve residue, 325 mesh of 20 ppm, and a pour density of 130 g/dm$^3$. Vulcan® is a conductive carbon black pellet or powder having an OAN of about 174 cc/100 g, surface area of 210 m$^2$/g, 325 mesh residue of less than 25 ppm, and density of about 264 kg/m$^3$.

Oxidized carbon supports (oxidized for example by $HNO_3$/$H_2SO_4$) and other carbides, nitrides and silicides of metals, for example, titanium carbide (TiC), tungsten carbide (WC), titanium nickel carbide (TiN) and silicon carbide (SiC) can all be used as a carbon support in the present methods. The nano-carbon supports can include carbon nanotubes, carbon nanofibers, carbon nanowires, carbon nanohorns and carbon nanorings.

Metal Precursor Molecules

The transition metal plays an important role in the catalytic activity of the present catalysts. The transition metal, and hence the resulting substrate and catalyst containing the transition metal, is preferably substantially free of all precious metals, such as ruthenium, rhodium, palladium, osmium, iridium, platinum, gold, and silver. As used herein, the term substantially free of precious metals means that precious metals are not intended to be included with the transition metal, and the transition metal precursor is either free of precious metals, or the presence of precious metal is a negligible amount, for example, less than 0.1% by weight. Precious materials have high material costs, and are required in large amounts to achieve desirable operation voltages and currents. In comparison, examples of suitable transition metals for the transition metal target include iron, cobalt, nickel, chromium, cerium, zinc, zirconium, molybdenum and manganese. These suitable transition materials are less expensive than precious metals, thereby reducing material costs during manufacturing. In addition to the transition metals in ionic form, the present methods also contemplate the use of these transition metals in the form of transition metal macrocycles, transition metal salts and combinations thereof.

The transition metal macrocycle comprises a large, generally ring or crown-like molecule such as a phthalocyanine, having a metal atom retained in its central portion, generally by co-ordinatively bonding with one or more of nitrogen, oxygen and/or other atoms having an unshared pair of electrons, or delocalized electrons, as for example in a bond. Other examples of macrocycles include metallocenes, porphyrins, chlorophyll derivatives of imidazoles or pyrroles and the like. While a variety of transition metals may be employed in the practice of the present technology, some particularly preferred transition metals include iron, cobalt, nickel, chromium, cerium, zinc, zirconium, molybdenum and manganese.

Dispersion of the transition metal containing macrocycles may be accomplished by dissolving the macrocyclic compound in a solvent, dispersing the carbon support material into the solvent, and evaporating the solvent to provide a support material having the transition metal macrocyclic compound adsorbed onto the carbon support. In other embodiments, the adsorption may be accomplished by ball milling the materials together or by evaporating the macrocyclic compound onto the support substrate provided that the macrocyclic compound has sufficient volatility.

In some embodiments, the transition metal macrocycles can include one or more of transition metal organometallic derivative complexes. Such organometallic macrocycles can include for example cobalt pthalocyanine, iron pthalocyanine, iron and cobalt naphthalocyanine, cobalt tetraazannulene, iron tetramethoxy phenyl porpyrin chloride, tetracarboxylic cobalt, iron pthalocyanine, tetramethoxy phenyl porpyrin chloride, cobalt salen-N,N'-bissalicylidine, ethylenediaminocobalt, cobalt-anten-O-amino, ferrocene, benzaldehyde, dimethylglyoxime, ethylenediamino cobalt and iron phenanthroline.

In some embodiments, the transition metal precursor may be a transition metal salt. In various embodiments, the transition metal salt is a combination of a transition metal cation, for example: $Fe^{2+}$, $Fe^{3+}$, $Co^{2+}$, $Co^{3+}$, $Cr^{2+}$, $Cr^{3+}$, $Cr^{6+}$, $Mn^{2+}$, $Mn^{3+}$, $Mn^{4+}$, $Mn^{7+}$, $Zn^{2+}$, $Ni^{2+}$ and $Ni^{3+}$ paired with a common anion species, for example, acetate, formate, nitrate, chloride, sulfate, oxy-chloride and phosphate. In some embodiments, preferred transition metal salts can include, for example, ferrous and ferric salts with one or more of acetate, formate, chloride, sulfate, oxy-chloride, phosphate anions;

cobaltous and cobaltic salts with one or more of chloride, acetate, nitrate, sulfate anions; chromium acetate; cerium acetate; zinc chloride and zirconium acetate.

As shown in FIG. 1, step 120 provides for the addition or blending of a nitrogen precursor compound with the metal precursor loaded carbon substrate to form a carbon-metal-nitrogen precursor. The amount of the nitrogen precursor added to the carbon-metal substrate prior to pyrolysis can vary depending on the specific application requiring the cathode catalysts of the present technology. In some embodiments, the metal precursor loaded carbon-metal substrate in the form of powder or granular particles can be admixed with the nitrogen precursor in any suitable mixing vessel. In some embodiments, the carbon-metal substrate and the nitrogen precursor can be mixed together in a mortar with a pestle.

Typically, for fuel cell cathode catalysis (both hydrogen and methanol fuel cells), a mixture of metal precursor loaded carbon substrate and a nitrogen precursor in a range of from about 0.1 to about 40 nominal weight % can be used to prepare the cathode catalysts of the present technology. In some embodiments, the carbon-metal-nitrogen precursor can contain an amount of nitrogen precursor (weight % nominal nitrogen) ranging from 0.1% to about 18%, or from about 1% to about 15%, or from about 1% to about 12%, or from about 1% to about 9%, or from about 1.5% to about 15%, or from about 6% to about 15%, or from about 9% to about 15%, or from about 10% to about 15%, or from about 12% to about 15%. In some embodiments the carbon-metal-nitrogen precursor can contain an amount of nitrogen precursor (weight % nominal nitrogen content) ranging from 1% to about 15%, more preferably from 1.5 to about 12% by weight.

Nitrogen Precursor Molecules

In various embodiments of the present technology, a nitrogen containing precursor compound is added to the metal precursor loaded carbon substrate as shown in method step 120. Without wishing to be bound to any specific theory, it is believed that the after pyrolysis metal-$N_xC_y$ type of catalytic sites are formed possessing high catalytic activity for oxygen reduction as well as enhanced resistance to methanol poisoning while reducing oxygen. (Gupta, S. et al., J. Appl. Electrochem. (1998), 28:673-682).

In some embodiments, the nitrogen precursor is one or more heterocyclic nitrogen containing organic aromatic compounds and polymers comprising heterocyclic nitrogen containing organic aromatic compounds, including, for example, porphryins, pyridines, pyrimidines, quinolines, aromatic amines and polymers of pyrrole and aniline.

In some embodiments, the nitrogen precursor can include one or more nitrogen containing precursor molecules, for example, porphryins, pyridines, pyrimidines, aromatic amines, amines, melamine, urea and urea derivatives, poly (quinoxaline), nitroaniline, 1,10 phenanthroline, pthalocyanine, pyridine, bipyridine, polyaniline, pyrrole, polyvinyl pyridine, Pyridine based ligands-1,6 bis(4'-pyridine)-2,5-di-azahexane (BPDH), Bipyridine based ligands e.g. 4,4' bipyridine, terpyridine ligands: 4' phenyl 2,2'-6',2'-terpyridine, 2-2" bipyrimidine, 4-7 phenanthroline dipyrido[3,2,2'3' phenazine], 3-nitrophalimide, p-phenylazophenol, 6-quionoline carboxylic acid, 6-nitrobenzimidazole, 5-amino 6-nitro quinoline, 2,3 naphtalocyanine, 4,4'-azoxydibenzoic acid, 2 amino 5-nitro pyrimidine, hematin, 4,4' azo-bis[cyanovaleric acid], heamotoporpyrin dihydrochloride, 4,4' nitrophenyl azo catechol 4,6 dihydroxy pyrimidine, nitrophenyl, benzylamine, 1,6 phenylendiamine, tetracyanoquinodimethane, propylene di-amine, ethylene diamine, urea, selenourea, thiourea, dimethylformamide, ammonia and acetonitrile.

It has been found that the nitrogen/carbon (N:C) ratio may demonstrate an important property of nitrogen precursors for metal-nitrogen-carbon catalysts. As described in more detail in Example 3, below, increasing the N:C ratio of the nitrogen precursor may increase the accessible active site density by reducing carbon deposition in the pores of the carbon support during pyrolysis. For example, carbon deposition from various organic precursors post pyrolysis may lead to pore blockages and decreased oxygen reduction activity. As such, in certain aspects of the present technology, the nitrogen precursor compound used with the present disclosure may have a N:C ratio of 1:1, or greater. In other aspects, the nitrogen precursor compound may have a N:C ratio of at least about 2:1, or greater.

In still other aspects, the nitrogen precursor compound may be provided such that it is free of carbon, or its decomposition components are substantially free of carbon. As used herein, the term substantially free of carbon means that once the nitrogen precursor is subject to pyrolysis, the transformed product does not end up containing anything more than a negligible amount of carbon containing components that could potentially form deposits or lead to pore blockage. In certain embodiments, the pyrolyzed nitrogen precursor may contain less than 3 percent by weight of carbon containing components based on the total weight of the nitrogen precursor; for example, less than about 1 percent, less than about 0.5 percent, or less than about 0.1 percent by weight. For example, the nitrogen precursor compound itself may be free of carbon, in the case of ammonium hydroxide, or the precursor compound may undergo a decomposition reaction during pyrolysis that forms ammonia as a nitrogen precursor, along with water or carbon dioxide as a by-product, such that the nitrogen precursor does not provide any additional carbon material. In certain instances, it should be understood that the decomposition reaction may not provide for 100% conversion of all of the carbon containing compounds, thus there may be trace amounts of organic carbon containing compounds in the nitrogen precursor component. Table 1, below, provides decomposition reactions for non-limiting exemplary nitrogen precursor compounds that are either initially free of carbon, or that decompose and release the carbon as gaseous carbon dioxide, leaving nitrogen containing compounds free of carbon, such as ammonia. Numerous ammonia generating nitrogen precursors are known to those skilled in the art, and it has been found that these precursors may assist in minimizing any unwanted carbon deposits. Additional non-limiting exemplary nitrogen precursor compounds may include amides; carbamates; carbodimides; and thiocarbamides; as well as various ammonium salts, including those of acetate, carbonate, bicarbonate, sulfate, chloride, bisulfate, iodide, and the like.

TABLE 1

Exemplary Carbon-free Nitrogen Precursors.

| Precursor | Decomposition reactions |
|---|---|
| Ammonium hydroxide | $NH_4OH \rightarrow NH_3 + H_2O$ |
| Urea (+ water) | $NH_2CONH_2 \rightarrow NH_3 + HCNO$ |
|  | $HCNO + H_2O \rightarrow NH_3 + CO_2$ |
| Ammonium carbamate | $NH_4COONH_2 \rightarrow 2NH_3 + CO_2$ |

Once the carbon-metal-nitrogen precursor has been prepared, the next step in the synthesis of the present cathode catalysts is to pyrolyze the carbon-metal-nitrogen precursor in a closed vessel, in which reactions occur at its autogenic pressure. The autogenic pressure may be based on the nitrogen precursor evaporation, as the decomposition reactions typically increase nitrogen activity and mobility.

As shown in FIG. 1, method step 130, the carbon-metal-nitrogen precursor is placed in a pressure resistant vessel capable of sustaining the interior of the vessel with a reducing or neutral (inert) gaseous environment. Placing carbon-metal-nitrogen precursor in a vessel capable of withstanding both elevated temperatures and internal pressures, sealing of the vessel (with the precursor compounds inside) and heating of that vessel to elevated temperature, where the elevated internal pressure results from the existence of a gaseous phase for some or all of the resulting chemical constituents. While the inner vessel wall can in principle react to some extent (catalytically or non-catalytically) with the confined chemical species, and permit some degree of diffusion of atoms or molecules into the vessel from the interior of the vessel, the vessel must limit such processes to the extent of maintaining a substantial portion of the initial atoms in the vessel (as opposed to permitting substantial diffusion of atoms and/or molecules into and/or through the containment vessel or forming compounds with the inner vessel wall material and thus not being further available for reaction). The vessel materials, apart from the above general requirements, can in principle vary widely. A thick-walled quartz vessel was found to possess the necessary mechanical strength at high temperature and pressure, minimize chemical reactions with the reactants and minimize diffusion of the reactants into the vessel wall. However, other containment materials could be used for this purpose. In some embodiments, the vessel may be made from any industrial metal, for example heat and pressure resistant stainless steel. In some embodiments, the vessel can be made from quartz commonly used to digest or pyrolyze organic matter. Alternatively, any industrial vessel capable of passing a reducing or neutral gas into a chamber and capable of operating at an internal pressure of at least 2 bar can be used.

In method step 130, the carbon support is pyrolyzed (i.e., heated) at a temperature preferably in the range of from about 500° C. to about 1,200° C., and more preferably from about 600° C. to about 1,000° C. The pyrolysis step may be accomplished, for example, using a rotary kiln, a fluidized bed reactor, or a conventional furnace. The contents of the vessel can be then thermally treated by placing the vessel in a furnace or other heating apparatus capable of thermally treating the contents of the pressurized vessel to at least 1,000° C. This is accomplished by thermally treating the precursor material under elevated pressure, for example, pyrolizing the carbon-metal-nitrogen precursor in a vessel with an internal pressure of about 2 bar to about 100 bar.

A typical pyrolysis process 130 can employ a thermal treatment schedule, for example, the carbon-metal-nitrogen precursor material can be heated from a starting temperature of 5° C. over a period of 15 minutes to a temperature of 150° C. and held at that temperature for 20 minutes. Thereafter, the temperature can be raised over a period of 30 minutes to a pyrolysis temperature in the range of 600-900° C., and held at that temperature for approximately 30-360 minutes.

Thereafter, the pyrolyzed material is rapidly cooled to room temperature. The cooling can be facilitated by opening the furnace or microwave device while maintaining the flow of reducing gas over the material. The contemplated pyrolysis vessel enables the pyrolysis of the carbon-metal-nitrogen precursor to yield a carbon nano-structure, for example, porous carbon nanotubes containing disordered surfaces and coated with nitrogen precursor and the transition metal.

Other embodiments may require or preferentially use a more automated form of substrate pyrolysis under elevated pressure. For example, a continuous flow spray pyrolizer (SP) injects a spray of carbon-metal-nitrogen precursor into a connected furnace under elevated pressure. The droplets are atomized from the starting precursor solution with an atomizer and the droplets are then placed in a furnace. A variety of activities may occur inside the furnace during formation of the final product including evaporation of the solvent, diffusion of solutes, drying, precipitation, reaction between the precursor and surrounding gas, pyrolysis and sintering.

Once the carbon-metal-nitrogen precursor has been pyrolized in accordance with step 130, a carbon-metal-nitrogen catalyst, which can effectively reduce oxygen, is obtained. Although, the present catalyst will find primary use in low temperature fuel cells, as the cathode catalyst in membrane electrode assemblies for oxygen reduction reactions, the present cathode catalyst also finds utility in batteries and in electrochemical sensors.

Devices Employing the Cathode Catalyst

Several electrochemical catalytic applications can be envisioned for the present cathode carbon-metal-nitrogen catalysts of the present technology. Returning back to FIG. 1, step 140, the catalyst powder or carbon-metal-nitrogen cathode catalyst is taken from the reaction vessel and can be admixed with an ionomeric substrate, for example, Nafion® (E.I. du Pont de Nemours, Wilmington, Del., USA) to form a catalytic ink. The catalytic ink can be applied to any variety of solid supports, including, for example, any well known cathode material used in fuel cell manufacture. In some embodiments, the catalytic ink comprising the catalyst powder or carbon-metal-nitrogen cathode catalyst is deposited on an electrolyte membrane to form a membrane electrode assembly for use in a hydrogen or methanol fuel cell.

As described above, the catalysts produced using the methods described herein have particular efficacy in polymer electrolyte fuel cells requiring oxygen reduction reactions to generate electric current. As such, the present methods can be employed to produce cathode catalysts that can be used in direct methanol fuel cells, conventional hydrogen fuel cells and other electrochemical applications requiring a oxygen reducing cathode catalyst. In some embodiments, these carbon-metal-nitrogen cathode catalysts find particular utility in membrane electrode assemblies that can be used in the aforementioned methanol and hydrogen fuel cells. Essentially, a membrane electrode fuel cell comprises an electrolyte membrane disposed between a pair catalyst layers, i.e. an anode and cathode catalyst layer. The respective sides of the electrolyte membrane are referred to as the anode surface and the cathode surface. In a typical proton exchange membrane fuel cell, ("PEM fuel cell") hydrogen fuel is introduced into the anode portion where the hydrogen reacts and separates into protons and electrons. The electrolyte membrane transports the protons to the cathode portion, while allowing a current of electrons to flow through an external circuit to the cathode portion to provide power. Oxygen is introduced into the cathode portion and reacts with the protons and electrons to form water and heat. The reduction of the oxygen at the cathode is catalyzed by the catalysts produced by the methods described herein.

In one embodiment, ionomeric membrane is any commercially available electrolyte membrane, for example, Nafion® (poly(perfluorosulphonic acid), also commercially available as Aciplex® or Flemion®). Other ionomeric membrane materials known in the art, such as sulfonated styrene-ethylene-butylene-styrene; polystyrene-graft-poly(styrene sulfonic acid); poly(vinylidene fluoride)-graft-poly(styrene sulfonic acid); poly(arylene ether), such as poly(arylene ether ether ketone) and poly(arylene ether sulfone); polybenzimidazole; polyphosphazene, such as poly[(3-methylphenooxy)(phenoxy)phosphazene] and poly[bis(3-methylphenoxy)phosphazene]; and combinations thereof, may also be used. An anode catalyst comprises at least one metal. The at least one metal can include platinum, ruthenium, palladium, and combinations thereof, that are known and used in the art as fuel cell anode materials. The anode catalyst is typically deposited on ionomeric membrane by preparing a catalyst ink containing the at least one metal and applying the ink to one side of the ionomeric membrane. The anode catalyst can comprise a mixture of platinum and ruthenium, such as, for example, platinum-ruthenium black. The cathode catalyst of the present technology can similarly be applied to the other side of the ionomeric membrane. In some embodiments the cathode catalyst to be applied to the other side can include the oxygen reducing cathode catalyst of the present technology mixed with one or more recast ionomers. The recast ionomer can be an ionic conductor including, for example, poly(perfluorosulphonic acid), such as Nafion®, Aciplex®, or Flemion®; sulfonated styrene-ethylene-butylene-styrene; polystyrene-graft-poly(styrene sulfonic acid); poly(vinylidene fluoride)-graft-poly(styrene sulfonic acid); poly(arylene ether), such as poly(arylene ether ether ketone) and poly (arylene ether sulfone); polybenzimidazole; polyphosphazene, such as poly[(3-methylphenooxy) (phenoxy)phosphazene] and poly[bis(3-methylphenoxy)phosphazene]; and combinations thereof. In a preferred embodiment, the recast ionomer is Nafion®.

Yet, in other aspects of the present technology, the cathode catalyst may be coated on a gas diffusion media, or gas diffusion layer for use in an electrochemical cell. Thus, the present technology also relates to methods for making a cathode catalyst coated diffusion layer for a fuel cell. In various aspects, the method includes providing a gas diffusion layer, which may comprise a typical carbon fiber or carbon paper substrate as is generally known in the art to allow for gas and water transport. The method includes applying a cathode catalyst on at least a portion of the gas diffusion layer. As described in detail above, the cathode catalyst may be synthesized by: (i) mixing a carbon source with a transition metal precursor to form a metal precursor loaded carbon substrate, wherein the substrate is free of precious metals; (ii) adding a nitrogen precursor compound to the metal precursor loaded carbon substrate to form a carbon-metal-nitrogen precursor; and (iii) pyrolyzing the carbon-metal-nitrogen precursor at a pressure ranging from about 2 bar to about 100 bar, thereby forming an oxygen reducing cathode catalyst. The cathode catalyst may also be applied to the gas diffusion layer using a catalyst ink, as detailed in Example 3, below.

The following examples illustrate the various features and advantages of the technology and are not intended to limit the technology thereto. While the examples refer to Ketjenblack® 600JD, iron (II) acetate and 2,2' bipyridine, etc., it is understood that these materials represent one embodiment and that other embodiments describing different carbon supports, transition metals and nitrogen precursors described herein can be used.

EXAMPLES

Example 1

Production of Carbon-Fe-Pyridine Oxygen Reduction Cathode Catalyst

Nafion® solution (1100 EW, 5 wt. %) were purchased from Alfa Aesar, (Ward Hill, Mass., USA). A 5 mm glassy carbon rotating disk electrode ("RDE") was purchased from Pine Instruments (Grove City, Pa., USA). Ketjenblack® 600JD (Akzo-Nobel Polymer Chemicals, Chicago, Ill., USA) (CAS No. 1333-86-4) is used as carbon support, which is dispersed in 95% ethanol. To this solution, Iron (II) acetate corresponding to 1 wt. % of iron on carbon is added and the slurry is kept stirring for about 6 hr. After the solvent is evaporated and a dry composite powder is obtained, 55 mg of the composite material thus obtained is ground with varying amounts of 2,2' bipyridine ranging from 35 to 85 mg and the powder is subsequently charged into a stainless steel bomb that has a volume of 1.7 ml. The pyrolysis vessel (bomb) can be a closed vessel made from steel, ceramics or quartz. The material was charged into the bomb in an inert atmosphere. At around 273° C., bipyridine decomposes and increases the pressure inside the bomb and this in turn fixes nitrogen in the catalyst. Final chemical analyses of the resulting carbon-metal-nitrogen cathode catalysts having different quantities of pyridine nitrogen were determined using CHN analysis and provided in Table 2.

TABLE 2

Chemical data on the finalized carbon-metal-nitrogen cathode catalyst.

| Nominal Nitrogen content (%) | Final Weight (mg) | | Carbon, Hydrogen and Nitrogen content data derived from CHN analysis | | |
|---|---|---|---|---|---|
| | Sample 1 | Sample 2 | C | H | N |
| 1.5 | 58 | 57 | 95.68 | 0.18 | 0.71 |
| 6.9 | 70 | 68 | 93.88 | 0.21 | 1.75 |
| 8.9 | 64 | 69 | 93.56 | 0.19 | 1.86 |
| 9.7 | 65 | 65 | 94.23 | 0.10 | 1.49 |
| 10.3 | 65 | 68 | 94.15 | 0.09 | 1.66 |
| 10.9 | | 68 | 93.75 | 0.20 | 1.53 |
| 11.3 | | 123 | 93.4 | 0.30 | 2.93 |
| 12.5 | | 138 | | | |

Example 2

Electrochemical Evaluation of the Cathode Catalyst Performance

The catalysts thus obtained were tested in a rotating disc electrode set up, using 1N $H_2SO_4$ as the electrolyte at 40° C. As will be appreciated by those of ordinary skill in the art, the rotating disk electrode (RDE) consists of a disk on the end of an insulated shaft that is rotated at a controlled angular velocity. Providing the flow is laminar over the entire disk, the mathematical description of the flow is surprisingly simple, with the solution velocity towards the disk being a function of the distance from the surface, but independent of the radial position. The rotating disk electrode is used for studying electrochemical kinetics under conditions, such as those of testing the present technology, when the electrochemical electron transfer process is a limiting step rather than the diffusion process. $Hg/Hg_2SO_4$ was used as the reference electrode for all the studies and a platinum wire serves as the counter electrode. A glassy carbon rotating disk electrode (4 mm diameter and 0.2 $cm^2$ area) was used as the substrate for the supported catalysts. The catalyst ink was prepared by dispersing 4 mg of the carbon-metal-nitrogen oxygen reducing cathode catalyst powder ultrasonically in a solution mixture containing 150 µl isopropyl alcohol and 50 µl Nafion® (5 wt. % solution, E.I. du Pont de Nemours, Wilmington, Del., USA). 5 µl of the cathode catalyst suspension was deposited onto the glassy carbon RDE, which was subsequently air-dried. The electrode thus obtained was immersed in a solution of 1N $H_2SO_4$ saturated with $O_2$. The flow rate of oxygen was maintained at 100 ml/min using a Rotameter.

Steady state voltammograms were recorded on the RDE using a scan rate of 0.5 mV/s and the potential was scanned between 0.85V to 0.2V vs. SHE (Standard Hydrogen Electrode) at a rotation rate of 1500 rpm. The foregoing describes the results of testing and experiments utilizing an embodiment of the catalyst of the present technology while employing the well-known rotating disk electrode system. In order to gain insight into the nature of the catalytic active sites, the surface area of the catalysts was measured using adsorption and desorption techniques using the BET theory. The BET theory is a well-known rule for the physical adsorption of gas molecules on a solid surface, and is widely used for the calculation of surface areas of solids. (Brunauer, S., Emmett, P. H. and Teller, E., J. Am. Chem. Soc., (1938), 60:309). The surface nitrogen content of the pyrolyzed samples were evaluated using X-ray photoelectron spectroscopy ("XPS") technique and CHN and elemental analyses on the samples quantified the bulk amounts of C, H, N and Fe present in the catalysts. The morphology of the catalysts and nano-structural formation in these were observed using transmission electron microscopy ("TEM").

Figure 2:
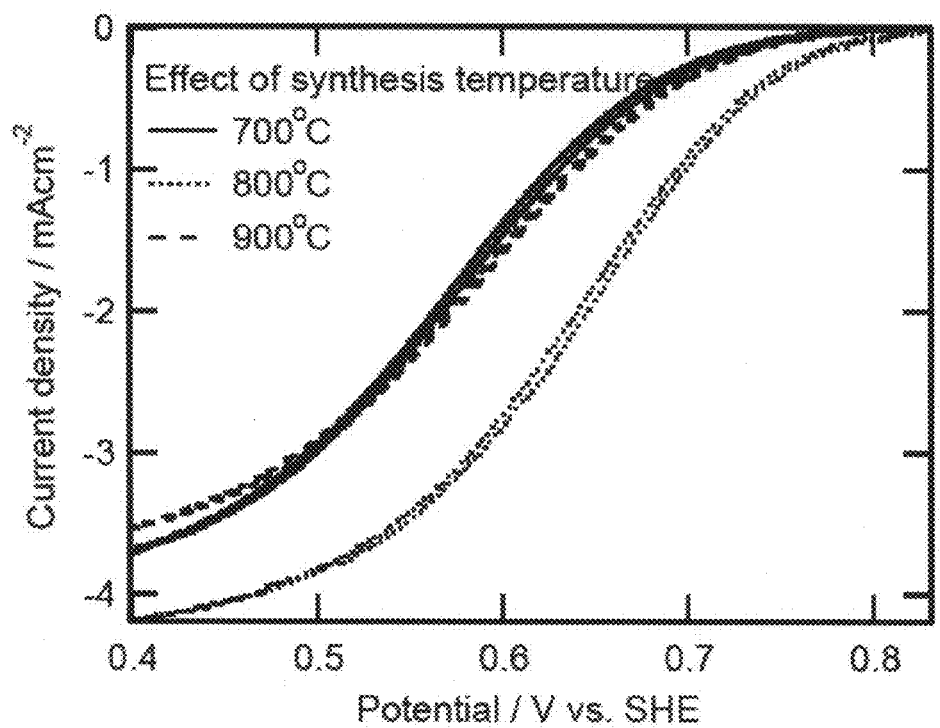
FIG. 2 shows the polarization curves obtained for various catalysts synthesized at 40° C. in 1N aqueous sulfuric acid, showing effect of heat-treatment temperature on the catalytic activity towards ORR.

As a first step towards characterizing the catalyst, the composite (carbon+Fe(II)-acetate+bipyridine) containing 9.7 wt % nominal nitrogen content was subjected to pyrolysis at temperatures between 700-900° C. Polarization curves shown in FIG. 2 were obtained at 40° C., while keeping RDE rotation at 900 rpm. The catalyst obtained at 700° C. and 800° C. shows similar onset potential, but improved kinetics appears for catalysts pyrolyzed at 800° C., at 2 mA/cm² current density about 20 mV more anodic potential was observed for 800° C. pyrolyzed catalysts in relation to 700° C. pyrolyzed catalyst. Loss of activity at 900° C. could be due to due to poor fixation of nitrogen in the carbon support, which could be confirmed from the CHN analysis. At 700° C., the decrease in surface area of the catalyst in relation to its 800° C. counterpart could be the reason for decreased activity.

Figure 3:
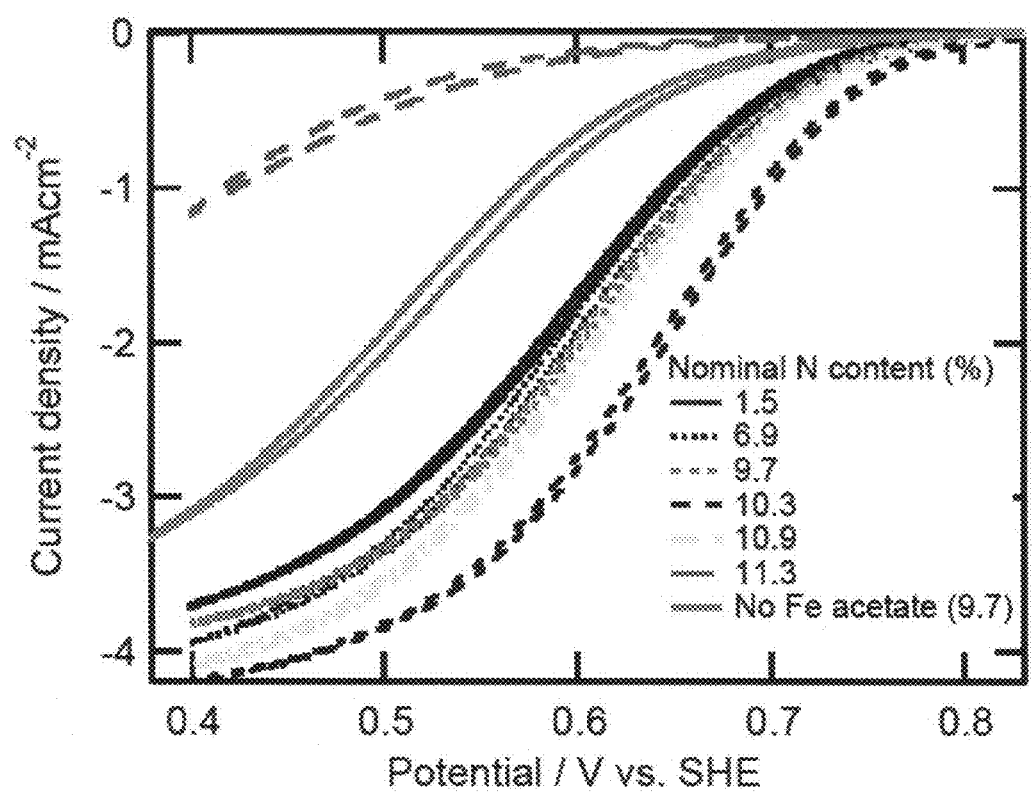
FIG. 3 shows the plot of current density as a function of nominal nitrogen content observed at three different potentials.

As shown in FIG. 3, the polarization curves recorded at 1200 rpm and 40° C. for a series of catalysts that were synthesized varying the amounts of nitrogen from 1.5% to 11.3% in the sample. An anodic shift in the onset potential can be observed until a nominal nitrogen content of about 10.3%. Beyond this, a further increase in nominal nitrogen content results in a very high overpotential towards ORR, primarily because of the excess amount of bipyridine that is not effectively decomposed during pyrolysis. As evident from Table 2, a huge increase in the mass obtained after pyrolysis can be observed and this reaffirms that the bi-pyridine has not decomposed completely. The high pressure pyrolysis was carried out in a stainless steel bomb and in order to evaluate the leaching effects of iron from the bomb, a sample was synthesized without the presence of any metal and after pyrolysis, this sample was tested. The electrochemical activity of this catalyst is shown in FIG. 3 and as observed there is a 100 mV cathodic shift in the potential when compared with the optimized 10.3% nitrogen content. This reinstates the significance of the metal precursor in the generation of active sites.

Koutecky-Levich analysis for the first order oxygen reduction reaction on the catalysts having a nominal nitrogen content of 10.3% and the chosen potential window for the same was between 0.65V to 0.5V. The kinetic current can be obtained using the following reaction.

$$\frac{1}{i} = \frac{1}{i_k} + \frac{1}{i_d} = \frac{1}{i_k} + \frac{1}{B \cdot C_0 \cdot \omega^{1/2}}$$

Where B is the Levich slope given as
$B=0.62nFScD^{2/3}\nu^{-1/6}$

Figure 4:
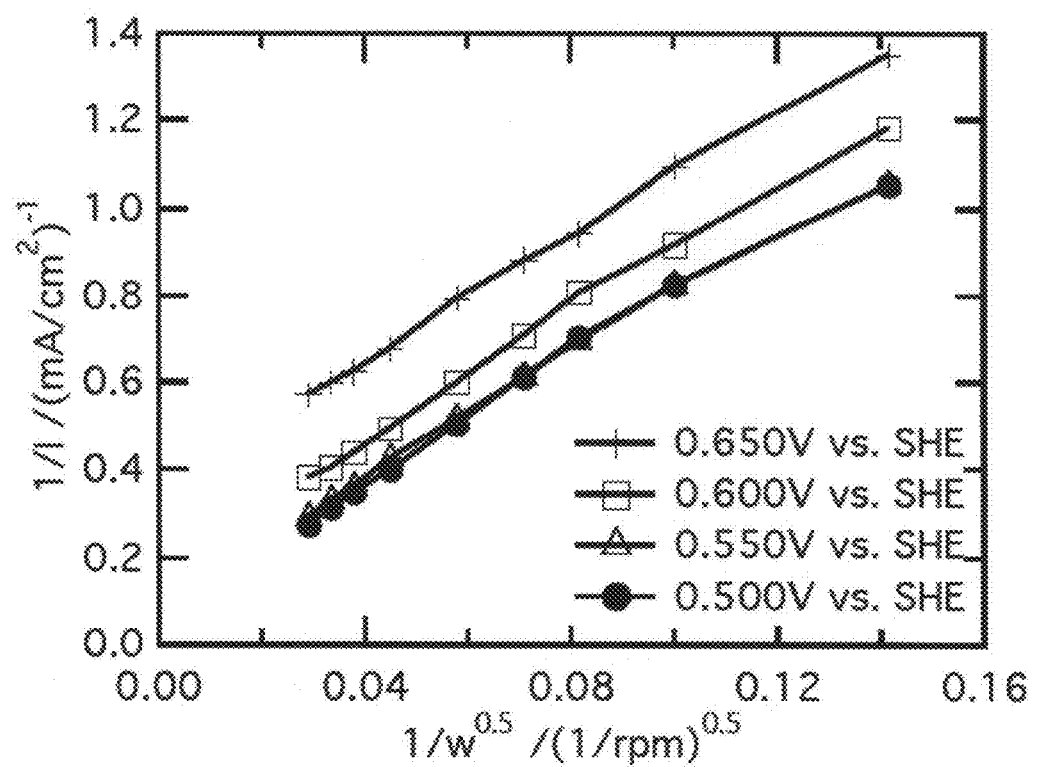
FIG. 4 shows a Koutecky-Levich analysis performed on catalysts loaded with 10.3% nitrogen.

FIG. 4 shows the some typical plots of 1/I versus $\omega$–½ for various potentials in the range of 0.65V to 0.5V vs. SHE. Linearity in the fit can be observed at all potentials with less than 2% error in standard deviation. The near parallelism of the slopes obtained from these plots indicates that there is no change in the reaction mechanism and the number of electrons exchanged does not vary substantially in these potential ranges. The number electron is estimated through this analysis is close be 4.39, and the values of the constants used in the calculations are $D_{O2}=2.1*10-5$ cm²/s, $C_{O2}=1.03*10^{-6}$ mol/cm³, kinematic viscosity $\nu=0.01$ cm²/s.

Figure 5A:
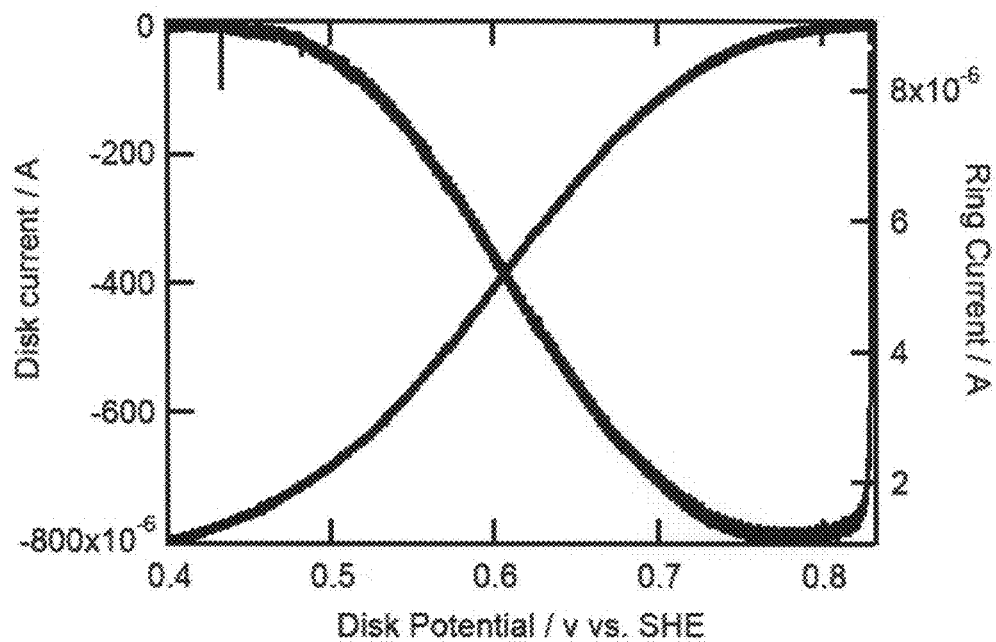
FIG. 5A shows a polarization curve obtained from rotating ring disc electrode ("RRDE") measurements at 40° C. in 1N aqueous sulfuric acid.
Figure 5B:
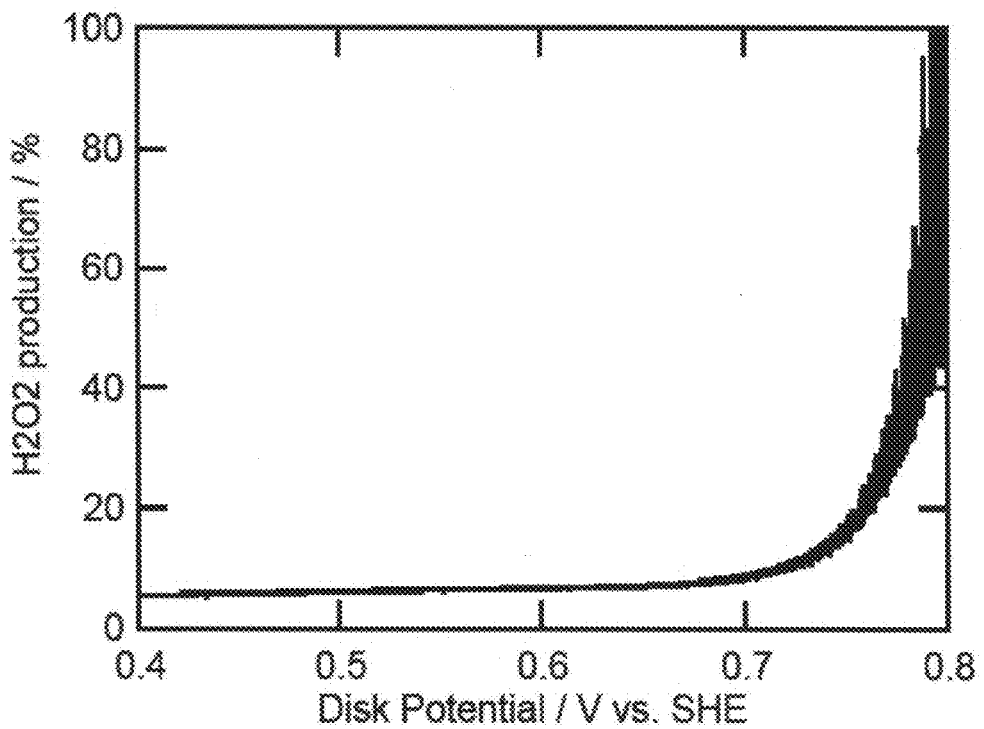
FIG. 5B shows a disk potential dependent $H_2O_2$ production curve for the optimized catalyst of the present technology having a nominal nitrogen of 10.3% coated on a rotating ring disc electrode ("RRDE").
Figure 6A:
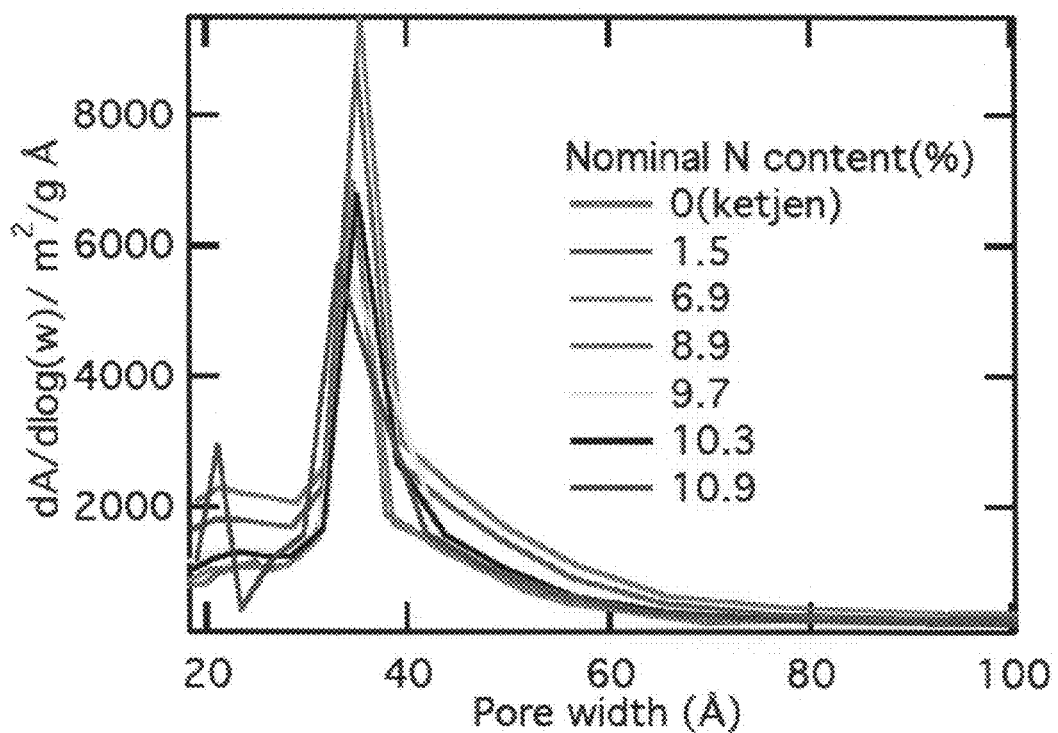
FIG. 6A shows the surface area distribution of various catalysts with different nominal nitrogen % content obtained from BJH desorption employing Halsey-Faas correction.
Figure 6B:
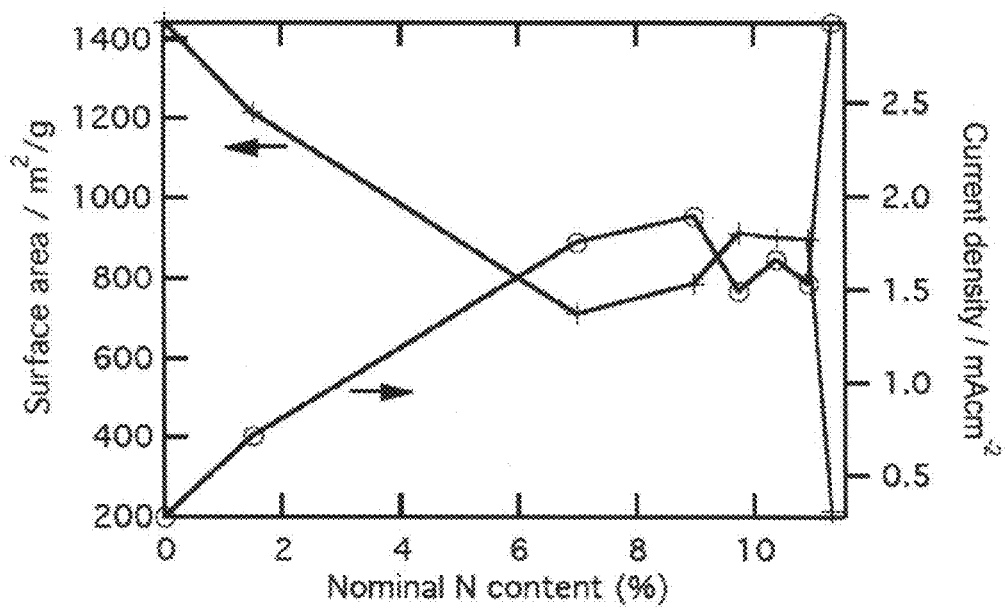
FIG. 6B depicts a calculated BET area for various catalysts with different nominal nitrogen content (%).

In order to evaluate the amount of hydrogen peroxide produced and hence the selectivity of the reduction of oxygen to water, a rotating ring disc electrode (RRDE) was used instead of an RDE. The disc potential was scanned at a rate of 0.5 mV/s, while the ring electrode was held at 1.2V vs. SHE, a potential sufficiently high to oxidize any peroxide if generated. FIG. 5A shows the disk and ring currents obtained using the optimized catalysts. The polarization curve obtained on ring is similar in shape to disk current, and shows well-defined plateau where disk-current shows plateau. The number of electrons involved in the reaction and the amount of hydrogen peroxide evolved can be obtained employing following equations.

$$n = \frac{4 \cdot I_D}{I_D + \left(\frac{I_R}{N}\right)}$$

$$\%H_2O_2 = 100 * \frac{(4-n)}{2}$$

Where n is the number of electrons transferred and N is the collection efficiency, which is 0.39 for our system. FIG. 5B shows a maximum $H_2O_2$ generation of about 7% while scanning the disk potential from 0.8-0.4V vs. SHE. In order to correlate the catalytic activity with respect to the surface area of the catalysts, BET surface area measurements on the catalyst surface were performed and area/pore volume distribution extracted from BJH desorption is shown in FIG. 6A. Initially a decrease in BET surface area from 1440 m²/g to 711 m²/g can be observed, which could be due to the reduction in the area of pores less than 4 nm. However, when the N content is increased beyond 6.9%, the surface area begins to raise up to 914 m²/g, which could be due to the formation of new pores of that are greater than 3 nm in size. As shown in FIG. 6B when the nitrogen content is increased beyond 10.9%, there is a sudden decrease in the surface area, which is due to the increased mass of catalyst due to the partial decomposition of bipyridine.

Example 3

The Nitrogen/Carbon (N:C) Ratio Affect on Cathode Catalyst Performance

As mentioned above, the Nitrogen/Carbon (N:C) ratio demonstrates an important property of nitrogen precursors for metal-nitrogen-carbon (MNC) catalysts. Increasing the N:C ratio of the nitrogen precursor increases the accessible active site density by reducing carbon deposition in the pores of the carbon support during pyrolysis.

In one example, Ketjenblack® 600JD is dispersed in a 95% ethanol solution, to which iron (II) acetate corresponding to 0.75 wt % Fe is added. This slurry is stirred for 6 hr followed by solvent evaporation to yield a dry powder. Powder samples of 55 mg are ground with varying amounts of pyridinic nitrogen rich precursors, such as bipyridine (having a N:C ratio of 0.2), pyrazine (N:C=0.5), purine (N:C=0.8), and melamine (N:C=2.0) to achieve nominal 6.3 wt % nitrogen loading. The powder is subsequently charged into a 1.7 mL quartz ampule. The ampule is flame-sealed under vacuum and subjected to heat treatment at 800° C. in a tube furnace. To remove excess iron, the resulting catalysts are exposed to aqueous 1N sulfuric acid at 80° C. for about 5 hr and rinsed with deionized water.

Electrochemical characterization is conducted using a glassy carbon rotating disk electrode (RDE, 0.2 cm² area) and a rotating ring-disk electrode (RRDE, Pine Research Instrumentation, Raleigh, N.C.) having a glassy carbon disk (0.25 cm² disk area) and a platinum ring (6.25 mm inner diameter, 7.92 outer diameter) in aqueous 1N sulfuric acid at 40° C.

Single fuel cell tests are carried out in a fuel cell test stand (Fuel Cell Technologies Inc.). A cathode catalyst ink is prepared by ultrasonically blending the MNC catalyst powder with 5 wt % Nafion® at a 2:1 ratio by weight in a solution of ethanol and water. The catalyst ink is then sprayed onto a 5 cm² gas diffusion layer (ELAT LT 1200W, BASF) using a Paasche airbrush to a loading of 2 mg cm⁻². A 5 cm² commercial anode (BASF) with a gas diffusion layer catalyzed by 0.4 mg cm⁻² of 20% Pt/C is used. A thin layer of Nafion® (0.5 mg cm⁻²) is applied to both catalyst layers to improve adhesion to the Nafion® membrane. The electrodes are hot-pressed onto a Nafion® 112 membrane (ion power) at 140° C. for 3 min at 10 atm. Impedance measurements are carried out at open circuit (~0.9 V cell potential) to measure ionic membrane resistance, with values of 60±7 mΩ cm² obtained at 10 kHz. All MEAs are broken in at 0.5 V cell potential for at least 10 h, followed by polarization at a cell temperature of 80° C., with humidification temperatures at 105-110° C., and pure $H_2$ and $O_2$ feeds (backpressure 1 bar) at 100 and 50 sccm, respectively. Durability of the catalyst layer was then measured by holding the cell potential at 0.5 V for 100 hours while recording steady-state current.

CHN analysis is performed using a combustion analyzer (PerkinElmer series II 2400). A sample of 4 mg is subjected to combustion in excess oxygen and the mass of collected products (carbon dioxide, water and nitric-acid) are used to calculate sample composition.

Thin-film rotating disc electrode (RDE) and rotating ring disc electrode (RRDE) studies are used to assess oxygen reduction activity and stability. FIG. 7A shows a series of polarization curves measured at 1200 rpm and 40° C. in 1N $H_2SO_4$ for catalysts synthesized using the four nitrogen precursors. A positive shift in the potential is observed with increasing N:C ratio of the nitrogen precursors. The polarization curves are corrected for mass transfer resistance and the resulting kinetic current density ($i_k$) is shown in FIG. 7B. All of these catalysts exhibit a very high onset potential (~0.88-0.93V vs. RHE, at currents 0.1 mA/mg) and the kinetic current at 0.8 V vs. RHE can be read directly from the Tafel plot. As the precursor N:C ratio increased from 0.2 to 2.0, the kinetic current density increased by a factor of 4, from 0.6 A cm⁻³ to 2.4 A cm⁻³. This may be attributed to increased nitrogen retention and surface area of these catalysts after pyrolysis. Barret-Joyner-Halenda (BJH) analyses of nitrogen desorption of the four catalysts (figure not shown) indicate that mesoporous pore volume appears in the 20-40 Å range. A 33% increase in BET surface area is observed for the melamine catalysts as compared to bipyridine (FIG. 7D), indicating that increased surface accessibility contributes to improved activity. Similarly, nitrogen retention of these catalysts, as measured by CHN combustion analysis, increases with an increasing N:C ratio as shown in FIG. 7D. A 50% increase in nitrogen retention was observed for melamine catalysts as compared to bipyridine. RRDE experiments indicate very low levels of $H_2O_2$ as shown in Table 3, below. These levels are comparable to conventional platinum based electrocatalysts, and much lower than similar iron based MNC catalysts.

TABLE 3

Catalytic Activity of Carbon-Metal-Nitrogen Catalysts

| | RDE† | | MEA† | | | |
|---|---|---|---|---|---|---|
| Nitrogen Precursor | $i_k$/mA mg⁻¹ (RDE) | ik (A cm⁻³) (RDE) | ik (A cm⁻²) (MEA) | ik (A cm⁻³) (MEA) | % $H_2O_2$ @ 0.6 V | Bulk N (wt %) |
| Bipyridine | 1.6 | 0.64 | 0.0035 | 2.0 | 4.8 | 1.3 |
| Pyrazine | 2.2 | 0.88 | — | — | — | 1.0 |
| Purine | 3.9 | 1.7 | — | — | — | 1.5 |
| Melamine | 5.9 | 2.4 | 0.021 | 12.4 | 5.2 | 4.1 |

†at 0.8 V/RHE, iR-corrected

Polarization curves for a single fuel cell membrane-electrode assemblies (MEAs) fabricated using these MNC cathode catalysts and commercial Pt/C anodes are recorded in a fuel cell test stand. Polarization curves obtained using catalysts based on bipyridine and melamine precursors are shown in FIGS. 8A and 8B. Current densities around 210 mA/cm² are obtained using melamine based catalysts in comparison with 50-430 mA/cm² at 0.6 $V_{iR-free}$/RHE reported for similar Metal-Nitrogen-Carbon catalysts. The volumetric current density (A cm⁻³, corrected for ohmic losses) is given as a Tafel plot in FIG. 8B. The cathode catalyst loading is maintained at less than 1.3 mg cm⁻² to avoid mass transport limitations. To obtain volumetric current density from mass current density, an electrode density of 0.4 g cm⁻³ is assumed, a typical value for porous carbon materials. The volumetric current density of the melamine based catalysts is close to 12.4 A cm⁻³, comparable to other literature reports. For the four nitrogen precursors considered, Table 3 summarizes kinetic current density measured via rotating disk electrode (RDE) experiments, and bulk nitrogen content measured via CHN combustion experiments. For the baseline material, bipyridine, and the more promising melamine, fuel cell membrane electrode assembly (MEA) current density measurements and hydrogen peroxide levels measured via rotating ring disk electrode (RRDE) experiments are included as well.

FIG. 8C presents the current density decay for melamine and bipyridine-based MEAs poised at 0.5 V over a period of 100 hr under pure $H_2$ and $O_2$. The performance loss for both the catalysts is less than 10% over this period. The degradation rate is similar for both precursors, though the current density of the bipyridine is much lower, suggesting that the carbon support, comprising 95% of the catalyst material, may play a crucial role in determining catalyst layer durability. Other issues, such as electrode structure and water management may also contribute to performance losses. FIG. 8D shows polarization curves obtained from melamine-based MEAs before and after durability measurements, showing a similar degree of degradation.

A class of MNC catalysts are synthesized for oxygen reduction in fuel cells, using a nitrogen precursor with a high N:C ratio that resulted in high nitrogen content, surface area, and catalytic kinetic activity as measured using a single fuel cell. In moving from a low N:C precursor (bipyridine) to one of high N:C (melamine), a four-fold (RDE) and six-fold (MEA) increase in kinetic current density is observed. This may be attributed to the three-fold increase in bulk nitrogen content for the improved catalyst and hence increased density of active catalytic sites, without significant pore blockage via carbon deposition. Stable activity for over 100 hr is demonstrated using the melamine based catalysts in a single fuel cell.

The embodiments described herein are exemplary and not intended to be limiting in describing the full scope of compositions and methods of the present technology. Equivalent changes, modifications and variations of embodiments, materials, compositions and methods can be made within the scope of the present technology, with substantially similar results.

Non-Limiting Discussion of Terminology

The headings (such as "Introduction" and "Summary") and sub-headings used herein are intended only for general organization of topics within the present disclosure, and are not intended to limit the disclosure of the technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition or method.

The citation of references herein does not constitute an admission that those references are prior art or have any relevance to the patentability of the technology disclosed herein. Any discussion of the content of references cited in the Introduction is intended merely to provide a general summary of assertions made by the authors of the references, and does not constitute an admission as to the accuracy of the content of such references. All references cited in the "Description" section of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested. Equivalent changes, modifications and variations of some embodiments, materials, compositions and methods can be made within the scope of the present technology, with substantially similar results.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components or process steps, the present technology also specifically includes embodiments consisting of, or consisting essentially of, such materials, components or processes excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include disclosure of all distinct values and further divided ranges within the entire range. Thus, for example, a range of "from A to B" or "from about A to about B" is inclusive of A and of B. Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on", "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A method for making an oxygen reducing cathode catalyst, the method comprising:
    (a) mixing a carbon source with a transition metal precursor to form a metal precursor loaded carbon substrate powder substantially free of precious metals;
    (b) adding a nitrogen precursor compound having a N:C ratio of at least about 1:1 to the metal precursor loaded carbon substrate powder to form a carbon-metal-nitrogen precursor powder; and
    (c) pyrolyzing the carbon-metal-nitrogen precursor powder in a closed reaction vessel and at an autogenic pressure ranging from about 2 bar to about 100 bar, thereby forming the oxygen reducing cathode catalyst, wherein pyrolyzing the carbon-metal-nitrogen precursor powder decomposes the carbon-metal-nitrogen precursor compound and increases nitrogen precursor activity and mobility.

2. The method according to claim 1, wherein the nitrogen precursor compound has a N:C ratio of at least about 2:1.

3. The method according to claim 1, wherein the nitrogen precursor compound comprises melamine.

4. The method according to claim 1, wherein the autogenic pressure ranges from about 6 bar to about 100 bar.

5. A method for making an oxygen reducing cathode catalyst, the method comprising:
    (a) mixing a carbon source with a transition metal precursor to form a metal precursor loaded carbon substrate powder;
    (b) adding a nitrogen precursor compound to the metal precursor loaded carbon substrate powder to form a carbon-metal-nitrogen precursor powder; and
    (c) pyrolyzing the carbon-metal-nitrogen precursor powder in a closed reaction vessel and at an autogenic pressure ranging from about 2 bar to about 100 bar, thereby forming the oxygen reducing cathode catalyst, wherein pyrolyzing the carbon-metal-nitrogen precursor powder decomposes the carbon-metal-nitrogen precursor compound and increases nitrogen precursor activity and mobility.

6. The method of claim 5, wherein the carbon source comprises one or more of pyrolyzed perylene tetracarboxylic anhydride (PTCDA), polyacrylonitrile (PAN), pyrrole black, graphitic powder, acetylene black, oxidized carbon supports, and metal carbides.

7. The method of claim 5, wherein mixing the carbon source with a transition metal precursor further comprises stirring the carbon source with the transition metal precursor in a solvent for up to 12 hours and evaporating the solvent to form the metal precursor loaded carbon substrate powder.

8. The method of claim 5, wherein the transition metal precursor is a transition metal macrocycle, a transition metal salt, or combination thereof.

9. The method of claim 5, wherein the transition metal precursor comprises a transition metal macrocycle selected from the group consisting of cobalt phthalocyanine, iron phthalocyanine, cobalt tetraazannulene, iron tetramethoxy phenyl porphyrin chloride, tetracarboxylic cobalt, cobalt salen-N,N' bissalicylidine, cobalt-anten-O-amino, ferrocene, benzaldehyde, ethylenediamino cobalt, iron phenanthroline, or combinations thereof.

10. The method of claim 5, wherein the transition metal precursor comprises a transition metal salt, the salt comprises (1) a cation selected from the group consisting of iron, cobalt, nickel, chromium, cerium, zinc, zirconium, molybdenum, manganese, and mixtures thereof; and (2) an anion selected from the group consisting of acetate, chloride, nitrate, sulfate, and combinations thereof.

11. The method of claim 5, wherein the nominal amount of the metal precursor added to the carbon source to form said metal precursor loaded carbon substrate ranges from about 0.75% to about 10% by weight of the substrate.

12. The method of claim 5, wherein the nitrogen precursor compound is selected from the group consisting of poly(quinoxaline), nitroaniline, 1,10 phenanthroline, phthalocyanine, pyridine, bipyridine, polyaniline, pyrrole, polyvinyl pyridine, 3-nitrophalimide, p-phenylazophenol, 6-quionoline carboxylic acid, 6-nitrobenzimidazole, 5-amino 6-nitro quinoline, 2,3 naphthalocyanine, 4,4'-azoxydibenzoic acid, amino 5-nitro pyrimidine, hematin, 4,4' azo-bis[cyanovaleric acid], heamotoporphyrin dihydrochloride, 4,4' nitrophenyl azo catechol 4,6 dihydroxy pyrimidine, nitrophenyl, benzylamine, 1,6 phenylendiamine, tetracyanoquinodimethane, propylene diamine, ethylene di-amine, urea, selenourea, thiourea, dimethylformamide, tetrahydrofuran, ammonia, acetonitrile and polymers, and combinations thereof.

13. The method of claim 5, wherein the nominal amount of nitrogen in the carbon-metal-nitrogen precursor powder ranges from about 1.0% to about 15% by weight of the carbon-metal-nitrogen precursor powder.

14. The method of claim 5, wherein the nitrogen precursor compound comprises melamine.

15. The method of claim 5, wherein the nitrogen precursor compound is free of carbon.

16. The method of claim 5, wherein the nitrogen precursor compound undergoes a decomposition reaction to form ammonia.

17. The method of claim 16, wherein the nitrogen precursor compound comprises an ammonia generating precursor selected from the group consisting of ammonium hydroxide, urea, ammonium carbamate, or combinations thereof.

18. The method of claim 16, wherein the nitrogen precursor compound comprises an ammonium salt.

19. The method of claim 5, wherein the pyrolyzing step comprises pyrolyzing the carbon-metal-nitrogen precursor powder at a temperature ranging from about 600° C. to about 900° C. in a quartz reaction vessel.

20. A low temperature fuel cell comprising an oxygen reducing cathode catalyst made by the method of claim 5.

21. A method for making a cathode catalyst coated diffusion layer for a fuel cell, comprising:
    (a) providing a gas diffusion layer; and
    (b) applying a cathode catalyst on at least a portion of the gas diffusion layer, wherein the cathode catalyst is synthesized by:

(i) mixing a carbon source with a transition metal precursor to form a metal precursor loaded carbon substrate powder;
(ii) adding a nitrogen precursor compound to the metal precursor loaded carbon substrate powder to form a carbon-metal-nitrogen precursor powder; and
(iii) pyrolyzing the carbon-metal-nitrogen precursor powder in a closed reaction vessel and at an autogenic pressure ranging from about 2 bar to about 100 bar, thereby forming an oxygen reducing cathode catalyst, wherein pyrolyzing the carbon-metal-nitrogen precursor powder decomposes the carbon-metal-nitrogen precursor compound and increases nitrogen precursor activity and mobility.

* * * * *